United States Patent
Tovani et al.

(10) Patent No.: US 8,409,439 B1
(45) Date of Patent: Apr. 2, 2013

(54) PRESSURIZED DIGESTER VESSEL

(75) Inventors: Ernest Peter Tovani, Englewood, CO (US); Gary D. Matzen, Longmont, CO (US)

(73) Assignee: Nested Nozzle Mixers, Inc., Centennial, CO (US)

( * ) Notice: Subject to any disclaimer, the term of this patent is extended or adjusted under 35 U.S.C. 154(b) by 401 days.

(21) Appl. No.: 12/769,269

(22) Filed: Apr. 28, 2010

Related U.S. Application Data

(60) Provisional application No. 61/173,226, filed on Apr. 28, 2009.

(51) Int. Cl.
*C02F 3/28* (2006.01)
*C02F 11/04* (2006.01)

(52) U.S. Cl. ........................................ 210/603; 210/194

(58) Field of Classification Search .................. 210/603, 210/612, 613, 175, 188, 194, 197, 252, 259
See application file for complete search history.

(56) References Cited

U.S. PATENT DOCUMENTS

| | | | |
|---|---|---|---|
| 2,538,412 A * | 1/1951 | Cecil et al. ................... | 210/603 |
| 3,440,781 A | 4/1969 | Lott | |
| 3,466,817 A | 9/1969 | Hagel | |
| 3,724,147 A | 4/1973 | Levenson | |
| 3,805,461 A | 4/1974 | Jagoda | |
| 3,853,764 A | 12/1974 | Armstrong | |
| 3,938,738 A | 2/1976 | Nagel et al. | |
| 3,942,291 A | 3/1976 | Hirata et al. | |
| 4,035,973 A | 7/1977 | Sutelan | |
| 4,049,195 A | 9/1977 | Rugenstein | |
| 4,051,204 A | 9/1977 | Muller et al. | |
| 4,086,663 A | 4/1978 | Croft | |
| 4,136,023 A | 1/1979 | Kirk et al. | |
| 4,141,184 A | 2/1979 | Vidal | |
| 4,162,971 A | 7/1979 | Zlokarnik et al. | |

(Continued)

FOREIGN PATENT DOCUMENTS

| GB | 2356446 | 11/1999 |
|---|---|---|
| WO | WO91/15287 | 10/1991 |

(Continued)

OTHER PUBLICATIONS

The Denver Post, Author: Raabe, Steve, Article—not titled—1 page dated Mar. 6, 2009. (attached).

(Continued)

*Primary Examiner* — Fred Prince
(74) *Attorney, Agent, or Firm* — Bryan Cave LLP

(57) ABSTRACT

A high pressure mixer is designed to generate high mixing turbulence within the bottom zone of a liquid holding vessel while simultaneously entraining and transferring liquid from the upper surface down to the vessel bottom. Mixing action is accomplished through the incorporation of two jet nozzles, nested one inside the other, strategically located and powered by pressurized liquid drawn from the vessel being mixed. Surface liquids are entrained using a weir section that is either a fixed or floating component of the mixer assembly. Liquid used for developing outlet velocity in primary jet is drawn from multiple locations including the vessel center zone, the vessel bottom and mixer annulus. Vessel pressure is maintained sufficiently high for a period to create a high concentration of dissolved gas in the slurry during digester operation. After shutting off the mixer pressure is lowered to release dissolved gas resulting in a three region segregation of slurry components.

18 Claims, 14 Drawing Sheets

U.S. PATENT DOCUMENTS

| | | | |
|---|---|---|---|
| 4,204,955 A | 5/1980 | Armstrong | |
| 4,234,560 A | 11/1980 | Kuerten et al. | |
| 4,246,099 A | 1/1981 | Gould et al. | |
| 4,255,262 A | 3/1981 | O'Cheskey et al. | |
| 4,275,020 A | 6/1981 | DiGregorio et al. | |
| 4,275,538 A | 6/1981 | Bounds | |
| 4,317,723 A | 3/1982 | Rapp et al. | |
| 4,372,856 A | 2/1983 | Morrison | |
| 4,462,390 A | 7/1984 | Holdridge et al. | |
| 4,545,907 A | 10/1985 | Repin | |
| 4,564,480 A | 1/1986 | Kamelmacher | |
| 4,599,167 A | 7/1986 | Benjes et al. | |
| 4,599,168 A | 7/1986 | Benjes et al. | |
| 4,633,909 A | 1/1987 | Louboutin et al. | |
| 4,662,759 A | 5/1987 | Leibee et al. | |
| 4,683,122 A | 7/1987 | Concordia et al. | |
| 4,690,764 A | 9/1987 | Okumura et al. | |
| 4,738,540 A | 4/1988 | Banks | |
| 4,750,454 A | 6/1988 | Santina et al. | |
| 4,880,313 A | 11/1989 | Loquenz et al. | |
| 4,885,094 A | 12/1989 | Srinivasan et al. | |
| 5,154,898 A | 10/1992 | Ajinkya et al. | |
| 5,190,374 A | 3/1993 | Harms et al. | |
| 5,199,231 A | 4/1993 | Dever | |
| 5,394,827 A | 3/1995 | Cheng | |
| 5,489,380 A | 2/1996 | Gaddis | |
| 5,681,109 A | 10/1997 | Palmer | |
| 5,735,600 A | 4/1998 | Wyness et al. | |
| 5,798,061 A | 8/1998 | Gaddis | |
| 5,942,116 A | 8/1999 | Clark et al. | |
| 6,110,255 A | 8/2000 | Williams et al. | |
| 6,279,277 B1 | 8/2001 | Zittmayr | |
| 6,395,175 B1 | 5/2002 | Gao et al. | |
| 6,440,317 B1 | 8/2002 | Koethe | |
| 6,464,875 B1 | 10/2002 | Woodruff | |
| 6,522,031 B2 | 2/2003 | Provanzana et al. | |
| 6,657,021 B2 | 12/2003 | Chanmayou et al. | |
| 6,764,213 B2 | 7/2004 | Shechter | |
| 6,998,056 B2 | 2/2006 | Scherzinger et al. | |
| 7,135,155 B1 | 11/2006 | Long, Jr. et al. | |
| 2002/0020677 A1 | 2/2002 | Noll | |
| 2003/0071372 A1 | 4/2003 | Scherzinger et al. | |
| 2003/0102752 A1 | 6/2003 | Mathisen | |
| 2003/0141229 A1 | 7/2003 | Chaffee | |
| 2004/0065590 A1 | 4/2004 | Chan et al. | |
| 2004/0148690 A1 | 8/2004 | Freeman | |
| 2004/0267408 A1 | 12/2004 | Kramer | |
| 2005/0029189 A1 | 2/2005 | Langhans et al. | |
| 2005/0111298 A1 | 5/2005 | Lott | |
| 2005/0246919 A1 | 11/2005 | Delons | |
| 2005/0279035 A1 | 12/2005 | Donovan | |
| 2006/0156725 A1 | 7/2006 | Kenessey | |
| 2006/0186042 A1 | 8/2006 | Keeton, Jr. | |
| 2006/0266703 A1 | 11/2006 | Stroot et al. | |
| 2007/0017228 A1 | 1/2007 | Surma | |
| 2007/0193948 A1 | 8/2007 | Livingston et al. | |
| 2008/0017558 A1 | 1/2008 | Pollock et al. | |
| 2008/0023397 A1 | 1/2008 | Clifford et al. | |

FOREIGN PATENT DOCUMENTS

| | | |
|---|---|---|
| WO | WO92/03220 | 3/1992 |
| WO | WO2005054594 | 6/2005 |
| WO | WO2006116658 | 11/2006 |

OTHER PUBLICATIONS

Scientific American, Biofuels, Article Titled: "Grassoline at the Pump", authors: George W. Huber and Bruce E. Dale, Jul. 2009, pp. 52-59. (attached).

"HCR process for the waste water treatment", author: Hyung Chang Communications, information booklet (attached).

* cited by examiner

ELEVATION VIEW

PLAN VIEW

PRESSURIZED DIGESTER VESSEL

CROSS REFERENCE APPLICATIONS

This application is a non-provisional application claiming the benefits of provisional application No. 61/173,226 filed Apr. 28, 2009.

FIELD OF INVENTION

The present invention relates to a vertical nested nozzle recirculation system in a pressurized and heated waste holding vessel to improve the mixing of a bottom (settled) slurry layer with a middle (suspension central mixing layer) with a top (foam/froth) layer.

BACKGROUND OF THE INVENTION

Anaerobic digestion is a series of processes in which microorganisms break down biodegradable material in the absence of oxygen. The process occurs naturally and can take place in many environments including conditions of high pressure. It is widely used to treat organic wastes such as wastewater sludge because it provides volume and mass reduction of the input material. Anaerobic digestion is widely used as a renewable energy source because the process produces a methane and carbon dioxide rich biogas suitable for energy production.

The digestion process begins with bacterial hydrolysis of the input materials in order to break down insoluble organics such as carbohydrates and make them available for other bacterial. Bacteria convert the sugars and amino acids into carbon dioxide, hydrogen, ammonia, and organic acids and then convert these resulting organic acids into acetic acid, along with additional ammonia, hydrogen, and carbon dioxide. These products are then finally converted to methane and carbon dioxide.

A digester is a process for optimizing the anaerobic digestion of biomass and possibly, for recovering biogas for energy production. Digesters control the environmental conditions of the resident organic material in order to continuously process/digest biomass into a waste sludge of reduced solids concentration and biogas. Anaerobic digesters are made out of many materials. They take the form of silos, troughs, basins or ponds.

All anaerobic digestion system designs incorporated the same basic components:
- Inlet sludge supply and conditioning system
- Digester vessel(s)
- Digester mixing and heating system
- Digested sludge removal and disposal system
- Biogas removal and conditioning system What is needed in the art is a pressurized digester that is a pressurized digester that is considerably more cost effective than the standard open top unpressurized digesters.

The present invention is aimed at three general commercial applications. They are an energy efficient large building such as a condominium having a digester to process wastes and generate electricity; a cattle farm having a digester to reduce animal waste and create electricity to run the farm; a municipal wastewater facility having a large, pressurized digester to reduce waste and produce enough electricity to run itself. A discussion of the energy efficient large building follows below.

Future energy efficient buildings will aim at being free from the use of fossil fuels. FIGS. 1, 1a show a building 1 having mixed use residential/commercial space 5. Clean energy is derived from the building's shape which functions as a solar collector as the earth orbits the sun. Wind energy is derived from a turbine section 4. See Pub. No. US2006/0156725 incorporated herein by reference. Curtain wall material-science technology panels are used throughout wherein the panels reflect solar heat in the summer and transmit solar heat in the winter. All black and grey water exits separate pipes in shaft 7. A black/grey waste processing system 6 includes mixing systems in digesters 8. Oxygen producing plants 3 are incorporated in the terraced roof system that can be a greenhouse. The waste processing system 6 could generate enough electricity to power building 1. The black and grey water shaft 7 enter a single stream recycle waste storage bin set 70. Next, a grey waste clarifier 71 clarifies the grey waste. Next, the settled grey waste is held in bins 72. Next, a sewage clarifier 73 further clarifies the settled grey waste from bins 72. Next, the liquid pretreatment processor 82 readies the slurry for injection into the digesters 8. Output from the digesters 8 includes a water treatment facility 74, and biogas goes to the biogas treatment processor 75. Next the biogas goes to the natural gas pipeline 76 to the facility boilers 77. Steam from the facility boilers 77 powers the electric generators 78. The composter reactor 79 readies the solid waste for removal. A microfiltration unit 80 readies digester water output for delivery to the storage pond 81, which could also hold excess from clarifiers 71, 73.

The main aspect of the present invention is to improve the efficiency of the digesters 8.

Related art includes U.S. Pat. No. 4,690,764 (1987) to Okumura et al. which discloses a horizontal aerator using a pressurized liquid nozzle nested in a gas inlet nozzle assembly, wherein oxygen in small bubbles is mixed into the raw water liquid. A fluid straightener ejects the aerated mixture into a water tank.

U.S. Pat. No. 5,942,116 (1999) discloses an anaerobic sludge digester having an egg shape. A central draft tube has pump to pump settled sludge at the bottom of the vessel up the tube to the top where spray nozzles create motion on the top surface.

The present invention is an apparatus for mixing both homogeneous liquids and non-homogeneous liquid slurries in vessels/reactors of varying geometry. Non-homogeneous slurries include mixtures of liquids, solids and gases in varying relative concentrations. The solids in non-homogeneous liquid slurries include both floating and settling constituents. The apparatus is capable of fully entraining floating and sinking solids for the purpose of promoting a chemical or biological reaction that changes the relative constituency of the slurry components that can vary from inert solids of varying size to complex organic molecules and particles.

Reactor dynamics can include control of slurries that can segregate in a variety of ways. Slurries can include a fully homogeneous liquid mixture entraining non-homogeneous materials. This material includes light solids trapped by rising gas bubbles that form a froth on the surface of the slurry. Materials of both high and low specific gravity tending to float or sink unless acted on by a positive mixing velocity gradient and fibrous and stringy materials. In many cases the ability of a reactor to perform the intended chemical/biological function depends on the operation of a device that blends both floating and settled slurry components with the liquid and neutrally buoyant slurry mass.

Reaction vessels can be built in many configurations. However, tall cylinders present an economical configuration for most reactor vessels that include both low and high-pressure environments. Mixing devices differ in the way they accomplish entrainment of the vessel contents in the three general zones of interest within the reactor. These zones from top to bottom are the surface where slurry components can accumulate as a scum or froth. The center includes suspended slurry components. The bottom where high specific gravity materials settle when mixing gradients are insufficient to maintain the material in the center mix zone.

It can be shown that the energy required of a given mixing system to completely entrain all components of a mixed slurry is greatest for vessel bottoms and surfaces where a range of from low to high specific gravity solids are present. Mixers can be designed either to induce sufficient energy into the slurry in the form of localized slurry velocity to completely mix all zones of the reactor or selectively mix specific zones of the vessel with the intent to direct sufficient energy to accomplish acceptable component-entrainment. The former method uses the largest amount of energy to accomplish mixing, while the latter requires a more complex system to do the work.

A simple mixer design capable of mixing liquid slurry in all zones of a vessel/reactor is needed as an improved, more efficient, more effective and more reliable method to do the work.

The present invention uses a pressurized vessel having a double channel central draft tube in a pressurized and heated vessel. A pump forces fluid through a downward facing nozzle in the central channel. The high velocity fluid induces a vacuum in the outer channel to draw in sludge at various levels of the draft tube. The combined flows from the central and outer channels exit a second nozzle to hit the bottom of the vessel.

SUMMARY OF THE INVENTION

A unique digester process is designed to thicken digesting slurry and improve fuel gas quality while reducing volatile solids in an environment that extends the residence time of hard-to-digest solids.

Various bioreactor subsystems are necessary in order to maintain a smoothly operating and highly efficient digester producing a steady and predictable supply of usable biogas. Factors to consider when designing an anaerobic digestion system include cost, size, local climate, and the availability and type of organic feedstock. These subsystems are more fully described as follows:

Raw Sludge Conditioning

One of the factors noted to consider when designing an anaerobic digestion system includes the type of organic feedstock. In most liquid applications digester tanks are hydraulically sized to meet a target residence time desired for the organic feedstock being digested. In many applications the liquid feedstock is a weak solution of organic matter requiring a larger and more expensive vessel than needed with a more concentrated sludge. In these cases digester system designers thicken the feedstock using a variation of processes. Thickening feedstock should be considered an efficiency enhancing process for digestion facilities.

Raw Sludge Injection

The way a digester reactor is fed can affect its performance. In a continuous digester, organic material is constantly or regularly fed into the reactor vessel. Unlike batch-type digesters, continuous digesters produce biogas without the interruption of loading material and unloading effluent. It is also important to properly diffuse the feed sludge into the digester to reduce the occurrence of feed related performance upsets.

Digester Mixing

It is normally necessary that a mixing system be installed to create a homogeneous environment throughout a digester, so that the reactor volume can be fully utilized. Although some natural mixing occurs in an anaerobic digester because of rising gas bubbles and the thermal convection currents caused by the addition of heat, these levels of mixing are not considered adequate to ensure stable digestion process performance at high loading rates.

Physical mixing will lessen temperature stratification, reduce grit settling, and control the formation of a surface scum layer. It is generally believed that a proper level of mixing is desirable because it promotes contact between raw sludge and active biomass reducing organisms, and evenly distributes metabolic waste products during the digestion process. However, digester mixing is a parasitic load to the net production of energy when considering digester gas as a source of renewable energy. The US EPA has indicated that proper digester mixing requires a power input of 0.20-0.30 HP/1000 cu ft of digester volume.

| HYDROGEN SULFIDE REMOVAL SYSTEMS | |
| --- | --- |
| REGENERABLE $H_2S$ REMOVAL SYSTEMS | NON-REGENERABLE $H_2S$ REMOVAL SYSTEMS |
| DRY SORPTION PROCESSES | DRY SORPTION PROCESSES |
| Activated Carbon | Activated Carbon |
|  | Iron Sponge |
|  | Porostone |
|  | High Temperature Zinc Oxide |
|  | High Pressure/Low Temperature Zinc Oxide |
| LIQUID ADSORPTION PROCESSES | LIQUID ADSORPTION PROCESSES |
| Regenerative Iron Solution | Sodium Hydroxide |
| Regenerative Amines | Sodium Hydroxide/Sodium Hypochlorite |
|  | LIQUID SCAVENGER PROCESSES |
|  | Amine Neutralizers |
|  | Amine Reactants |
|  | Nitrite |
|  | DRY SCAVENGER PROCESSES |
|  | Sulfa Treat |

One aspect of the present invention is to provide a dual channel central draft tube in a pressurized mixing vessel, wherein a nested nozzle configuration provides for a circulation of slurry both through a pressurized channel from the vessel bottom to the top of the center tube in the central draft tube as well as flow from various inlets at the outside of the central draft tube and out a common nozzle pointed toward the vessel bottom of the reactor. The magnitude and velocity of the combined flows through the center channel and outer channel via the nested nozzles is sufficient to mobilize and entrain solids that tend to settle and collect at the bottom of the reactor.

Other aspects of this invention will appear from the following description and appended claims, reference being made to the accompanying drawings forming a part of this specification wherein like reference characters designate corresponding parts in the several views.

The invention describes a mixer comprising two submerged nozzles (one nested inside the other) connected to piping and apparatus that simultaneously mixes liquid slurries in three general mixing zones (surface, center, and bottom) within a reactor. The device is simple in configuration and construction and reliable in operation.

Contents of the vessel being mixed is removed from a selected location within the reactor and pumped through the center nozzle at a minimum nozzle velocity of 20 feet per second. Liquid flowing at this velocity through the primary nozzle identified as the primary jet entrains liquid located in the annular space between nozzles and connecting piping effectively drawing liquid from the surface of the mixed vessel. This mixture of liquid and any floating portion of the vessel contents are conveyed through the annulus to the primary jet where it is entrained and injected into the bottom zone of the vessel. The magnitude of this flow is dependent upon the nested nozzle geometry, the magnitude of the primary velocity and the bulk density of the entrained mixture. Collectively this portion of flow combined with the primary jet flow is described herein as the secondary nozzle jet.

The secondary nozzle jet entrains additional liquid within the center and bottom zone of the vessel reactor. The magnitude of this flow is dependent upon the vessel/reactor geometry and the magnitude of the primary velocity. At the general conditions applicable to this invention this flow is projected to be from three to four times the flow through the secondary nozzle. The result is high flow in the bottom zone of the vessel/reactor characterized by a high velocity jet of mixed liquid impingement at the low point of the reactor. The magnitude of the liquid flow and velocity is sufficient to mobilize and entrain solids that tend to settle and collect in the bottom of the vessel.

A unique digester process is designed to thicken digesting slurry and improve fuel gas quality while reducing volatile solids in an environment that extends the residence time of hard-to-digest solids. Characteristics of the construction and process features that establish this unique bioreactor system include the following:

1) A pressure vessel of specific geometry designed to operate at high internal pressure and to establish zones of differing slurry constituent consistency.
2) A vessel mixer having a double channel central draft tube is designed to entrain both floating and settling solids while imparting variable mixing intensity to different regions of the tank.
3) A process operation procedure is designed to control mass residence time of both heavy and light biomass slurries where:
   a. Reactor mixing occurs continually such that:
      i. Mixing is maintained high in the bottom zone continually entraining settling biomass.
      ii. Mid-zone slurry vertical flow is sufficiently stable to allow heavy biomass particles to fall into vessel bottom zone.
      iii. Top zone continually cycles floating solids into vessel bottom zone.
4) A process operation procedure is designed to thicken the biomass slurry in the reactor where:
   a. Vessel pressure is maintained sufficiently high for a period to create a high concentration of dissolved gas in the slurry during digester operation.
   b. After shutting off mixer, vessel pressure is lowered sufficiently to release dissolved gas in a controlled manner resulting in regional segregation of slurry components into a thick settled region, a clear center zone of liquid and a concentrated floating sludge layer.
      i. Separation is enhanced using coagulant treatment.
   c. Reactor waste connection is controlled to draw liquid from the vessel clear center zone for a period of time sufficient to increase slurry bulk solids concentration.
   d. Initiation of vessel mixing entrains both floating and settled solids.

Anaerobic digestion is a series of processes in which microorganisms break down biodegradable material in the absence of oxygen. The process occurs naturally and can take place in many environments including conditions of high pressure. It is widely used to treat organic wastes such as wastewater sludge because it provides volume and mass reduction of the input material. Anaerobic digestion is widely used as a renewable energy source because the process produces a methane and carbon dioxide rich biogas suitable for energy production.

The digestion process begins with bacterial hydrolysis of the input materials in order to break down insoluble organics such as carbohydrates and make them available for other bacteria. Bacteria convert the sugars and amino acids into carbon dioxide, hydrogen, ammonia, and organic acids and then convert these resulting organic acids into acetic acid, along with additional ammonia, hydrogen, and carbon dioxide. These products are then finally converted to methane and carbon dioxide.

A digester is a process device for optimizing the anaerobic digestion of biomass and possibly, for recovering biogas for energy production. Digesters control the environmental conditions of the resident organic material in order to continuously process/digest biomass into a waste sludge of reduced solids concentration and biogas. Anaerobic digesters are made out of many materials. They take the form of silos, troughs, basins or ponds.

All anaerobic digestion system designs incorporate the same basic components:
  Inlet sludge supply and conditioning system
  Digester vessel(s)
  Digester mixing and heating system
  Digested sludge removal and disposal system
  Biogas removal and conditioning system
  A schematic of subsystems required to successfully sustain a digester is shown in the following figure.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
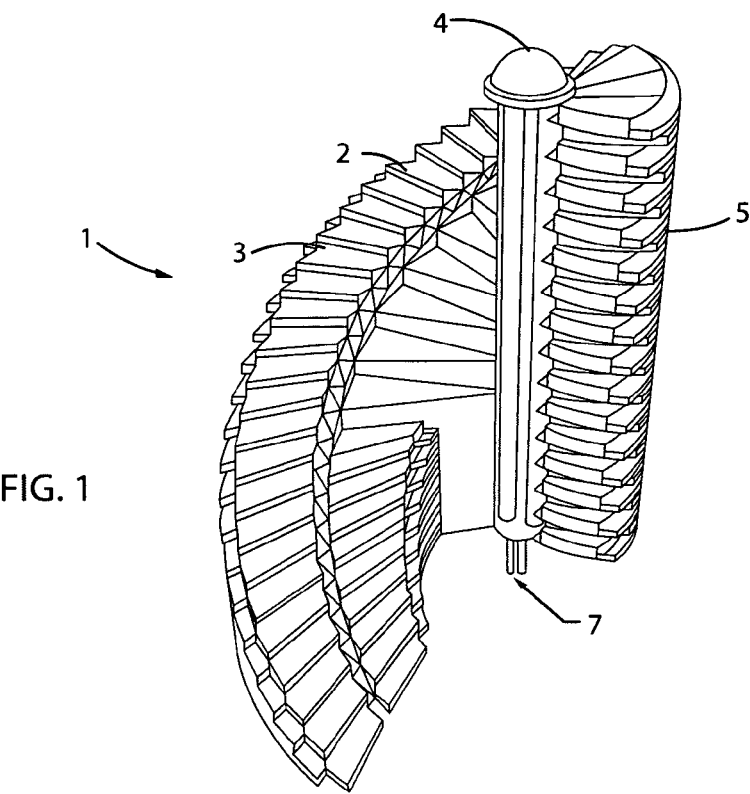
FIG. 1 is an isometric view of an energy efficient building.
Figure 1A:
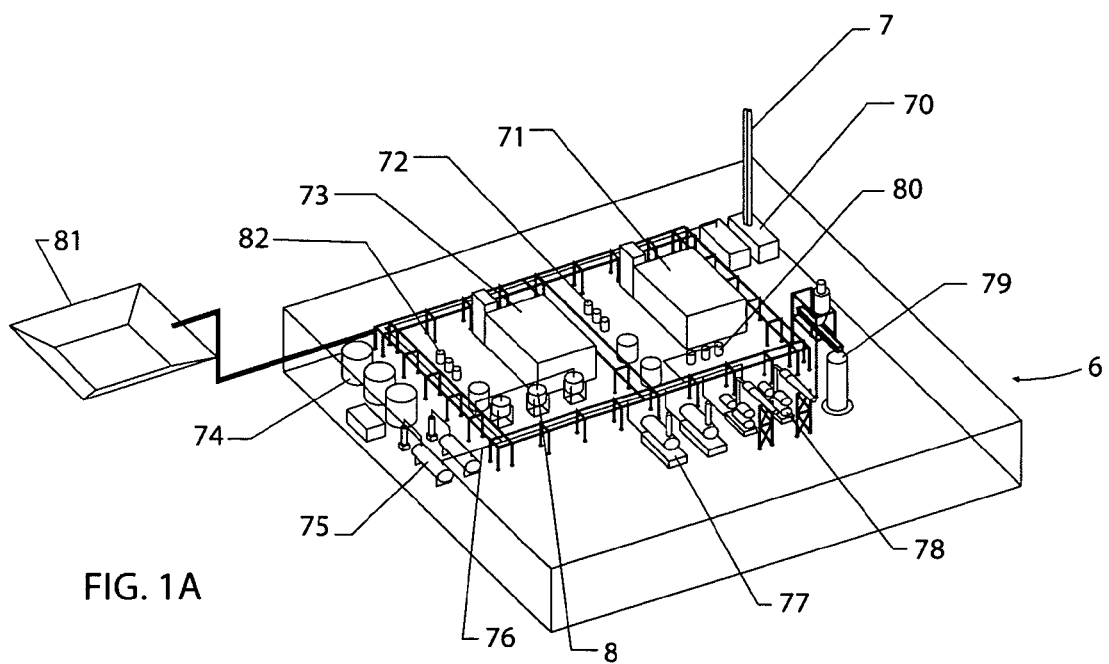
FIG. 1A is a schematic of a liquid waste processing system.
Figure 2:
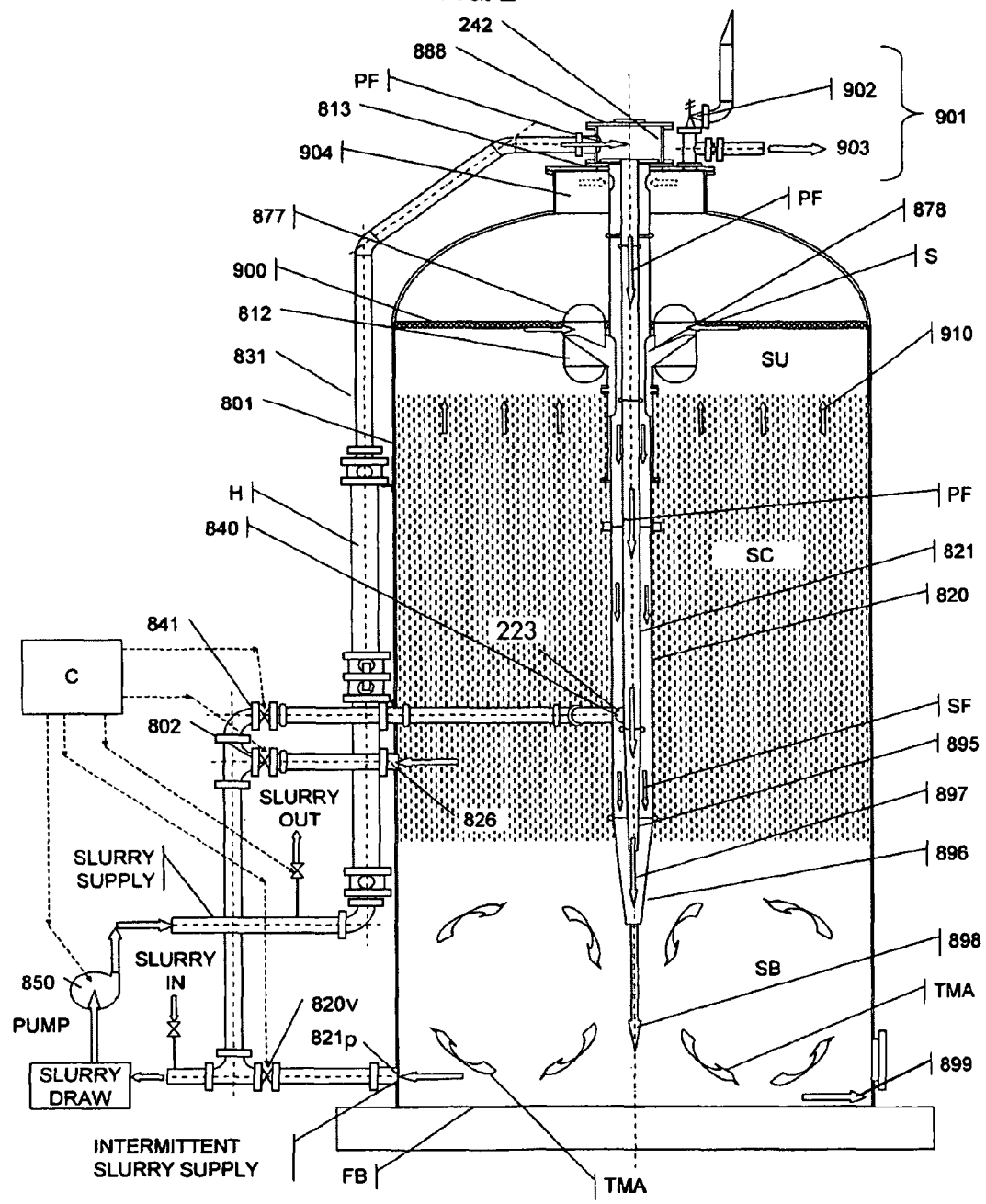
FIG. 2 is a cross sectional view of a reactor vessel using a central draft nested nozzle design.

Referring first to FIG. 2 a reactor 801 has a variable geometry designed to take advantage of the mixer capabilities in a flat bottom FB reactor vessel. A single mixer assembly 888 is shown to be center mounted in the reactor 801. An outer tube 820 surrounds an inner tube 821. The primary flow is indicated by arrows PF in the inner tube 821. The secondary flow is indicated by arrows SF in the outer tube 820.

The primary flow PF is created by pump 850. Normally flow initiates at the center port 826 with valve 802 open and valve 820 closed. When valves 802, 820 are reversed primary flow initiates at port 821, however, solid matter could foul the pump 850. Slurry In/Slurry Out ports indicates one possible feed/discharge of slurry into and out of the reactor 801. Riser pipe 831 carries the pressurized primary flow PF to the inner tube 821. An intermittent port 840 can initiate the primary flow PF and/or be used in conjunction with port 826 depending on the position of valve 841. A controller C may control the pump 850 and valves as shown. The riser pipe 831 may have a heater H. The secondary flow SF indicates at surface as shown by arrows S. This reactor 801 has a floating weir 877 with inlet ports 878 into the secondary flow SF in the outer pipe 820.

The primary nozzle 895 has a discharge 897 which creates a vacuum via a venturi effect and draws the secondary flow SF downward. The primary nozzle 895 is nested in the secondary nozzle 896. Primary nozzle flow is in the range of 20-50 feet per second. (FPS) The primary nozzle has a taper angle of 4 degrees or less. The combined nozzle flow at 898 creates a minimum 5 FPS impingement flow at the bottom FB and a minimum impingement at the wall shown by arrow 899.

The reactor 801 levels are the slurry bottom mixing zone SB, the slurry center mixing zone SC has suspended solids, and the slurry upper mixing zone SU has a top foam/froth layer 900. Arrows TMA show the circular turbulent mixing area.

The reactor head 901 consists of a flange 813 to support the tubes 820, 821. Tube 820 may have an annulus vent 904. The reactor 801 may or may not be pressure vessel depending on pressure control device 902. A gas outlet is shown at 903. Arrows 910 show how the downward facing nested nozzles 895, 896 create an upflow.

Figure 3:
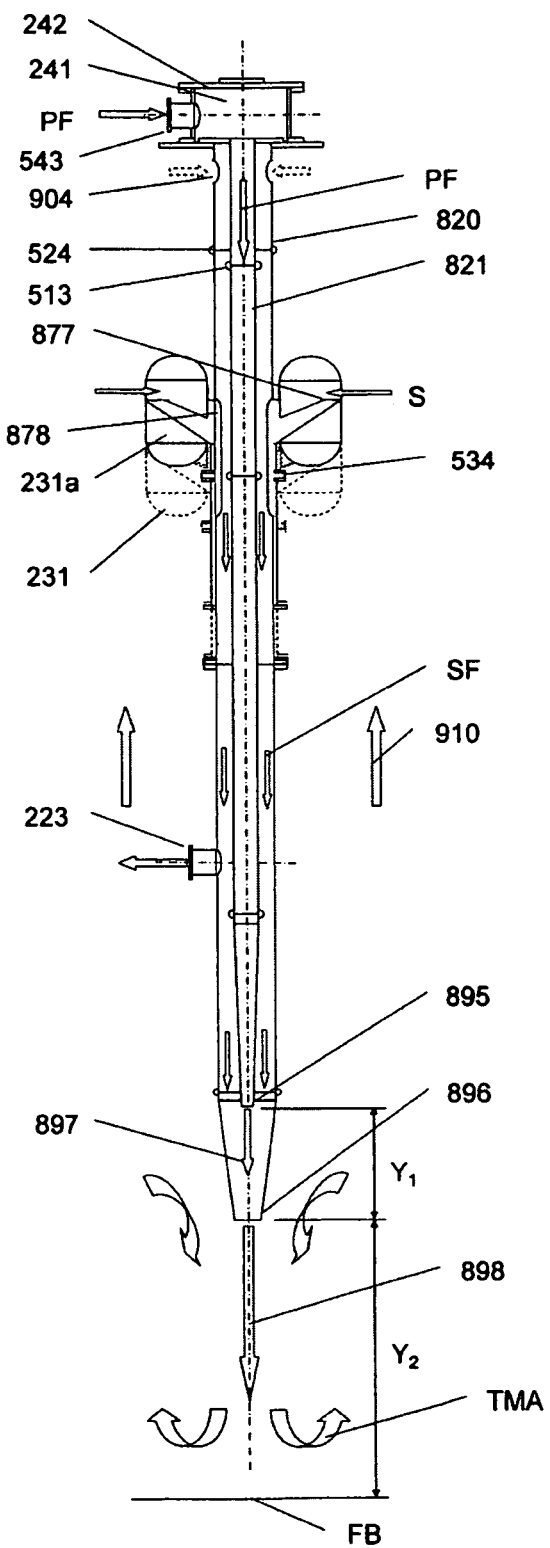
FIG. 3 is a side elevation view of a central draft nested nozzle having a floating weir for the upper inlet to the outer channel.
Figure 4:
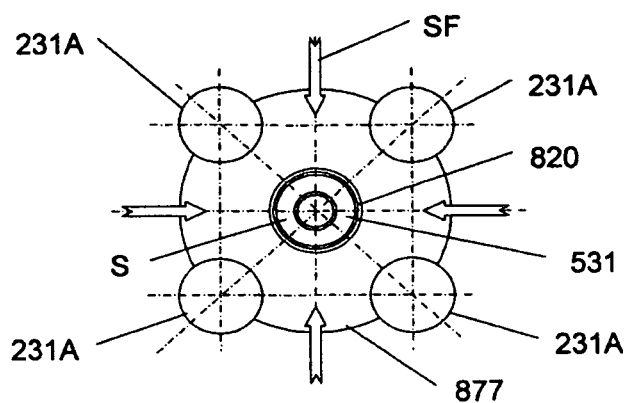
FIG. 4 is a top plan view of a floating weir with four floats.
Figure 5:
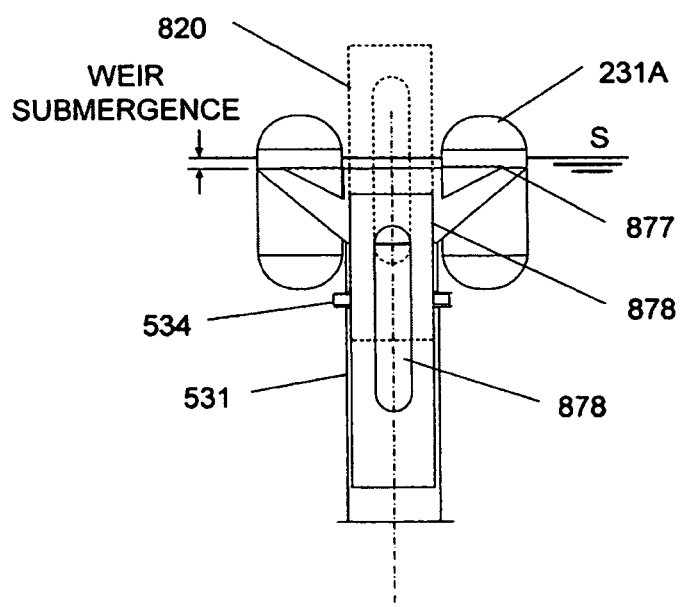
FIG. 5 is a side elevation view of a four float weir.

Referring next to FIGS. 3, 4, 5 the primary nozzle supply box 242 diverts the horizontal primary flow PF to a downward primary flow PF in area 241. The primary flow PF usually ranges from 5-10 FPS. An alternate slurry removal point 223 is shown. Three or more ballast tanks 231A (dots 231b show movement) on the weir 877 supply buoyancy so the weir 877 floats below the liquid surfaces S. A cylindrical tube section 531 allows the weir 877 to slide up and down the outer tube 820. A leak control ring 534 is shown. Ports 878 to outer tube 820 may be slotted.

Figure 6:
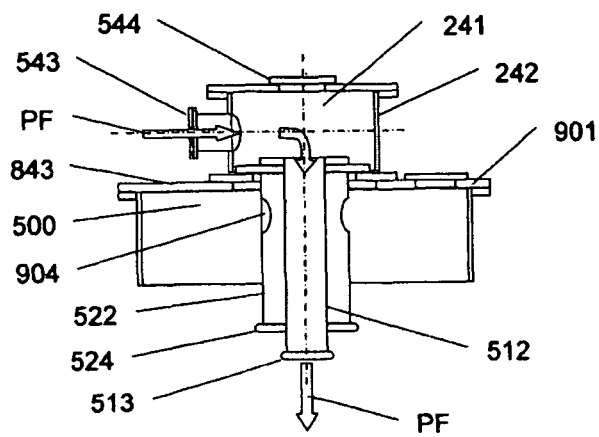
FIG. 6 is a side elevation view of the nested nozzle design connection to the vessel.

Referring next to FIG. 6 the head assembly 901 has a flanged hatch 544 for inspection of the primary nozzle supply box 242. Pipe couplings 513 (inner pipe 512) and 524 (outer pipe 820) are shown. The outer pipe supply section 522 is shown. Flange 843 covers opening 500. Pipe coupling 543 connects to pipe 831 (See FIG. 2).

Figure 7:
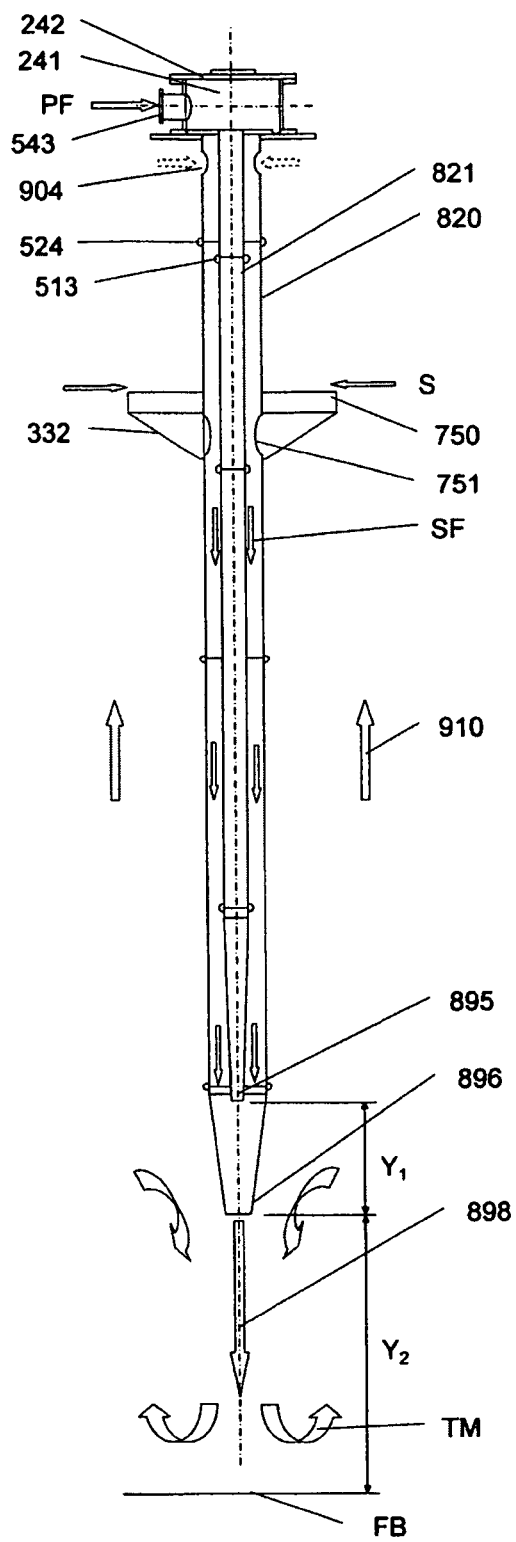
FIG. 7 is a side elevation view of a central draft nested nozzle design without a floating weir.

Referring next to FIG. 7 a fixed weir 750 collects slurry at a fixed surface level S. The weir 750 funnels the slurry into the secondary flow inlet 751.

Figure 8:
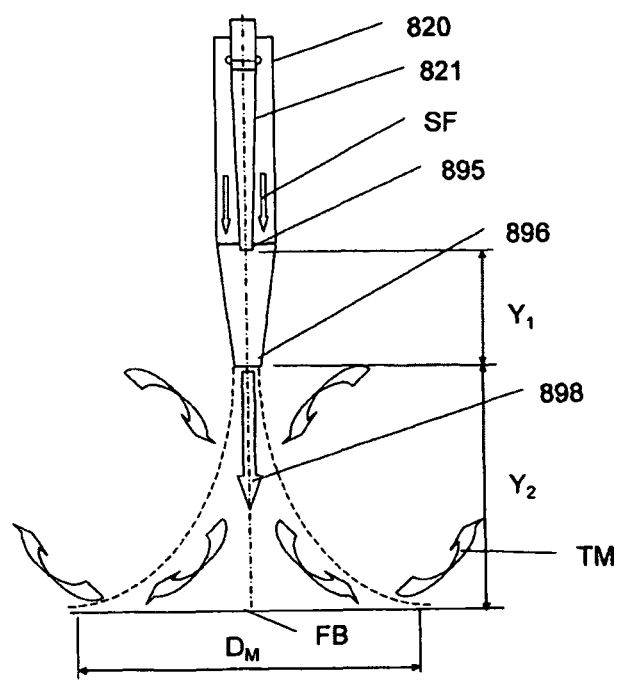
FIG. 8 is a close up view of the nested nozzles shown in FIG. 3.

Referring next to FIG. 8 some critical dimensions are shown. The configuration of the nested nozzles of the present mixer invention is shown in FIG. 7. Critical dimension restrictions are identified in the figure as "DM", "Y1" and "Y2". Here "DM" identifies the zone of pressure of the jet impinging on the vessel bottom. This dimension identifies the influence area of the nozzle and is used to determine the size and number of mixers to be used in vessels of varying bottom diameter. The dimensions "DM", "Y1" and "Y2" as well as the diameter of the secondary nozzle are calculated based upon the primary nozzle size selected. The criteria for establishing these values are provided hereinafter.

As seen in FIGS. 1, 2, 3, 8 and 9 the secondary nozzle discharge outlet is oriented vertically at a location near the bottom of the vessel/reactor.

The secondary jet velocity and the external flow entrained by the jet action impinges on the vessel bottom resulting in high mixing energy that mobilizes and entrains the heavy solids preventing accumulation at the vessel bottom.

The mixing energy generated below the mixer nozzle decays within the liquid slurry in the zone above the nozzle resulting in a tendency of heavy solids to settle back into the high shear zone near the mixer nozzle. A zone of mixed solids exists due to the balance of forces that tend to mix and convey solids towards the top of the vessel opposed by the solids falling as a result of particle density and geometry. In tall reactor vessels this zone of mixed heavy solids tends to improve the reaction dynamic of suspended solids, can thicken the liquid slurry when liquid is selectively removed from the vessel in areas above the zone and increases the residence time of heavier solids within the vessel/reactor.

When required, heavy solid removal is accomplished by extracting slurry from the bottom zone of the vessel. The method for removing liquid slurry from the bottom area of the vessel is not an embodiment of the invention.

The geometric requirement of the nested nozzle arrangement is illustrated in the embodiment of the invention in FIG. 7 in order to accomplish heavy solid mixing at the bottom of the vessel/reactor.

The range of values of critical dimensions is as follows:

Nozzle Diameter Ratio $$d_2/d_1 = C_1$$

Where:
$d_2$ = Secondary Nozzle ID (in.)
$d_1$ = Primary Nozzle ID (in.)
$C_1$ = 2.1-2.5 (range)

Nozzle Separation $$Y_1 = C_2 \times d_1$$

Where:
$Y_1$ = Distance between the outlet end of the primary and secondary nozzles (in.)
$C_2$ = 6.0-6.4 (range)

Secondary Nozzle Location $$Y_2 = C_3 \times d_1 \times V_o - Y_1 = (C_3 \times V_o - C_2) \times d_1$$

Where:
Y2=Distance between end of secondary nozzle and vessel bottom (in.)
Vo=Primary nozzle outlet velocity (54 per second)
C3=1.2-1.5 (range)
Mixer Influence Diameter $$Dm = C4 \times d1 \times Vo$$

Where:
Dm=Mixer influence diameter at vessel Floor (in.)
C4=2.6-3.3 (range)

In addition a geometric limitation to the nozzle convergence angle is claimed in order to reduce the potential for the generation and formation of fine bubbles within the core of the nozzle jet when mixing Liquid slurry that is saturated with a gas. This gas can take the form of air products entrained in the liquid or a product of reaction within the vessel that forms a gas, which saturates the bulk slurry within the vessel. In these cases the converging angle of the nozzle from the liquid inlet end to outlet is limited to 4.0 degrees.

Foam Froth and Emulsion Control

Foam, froth and/or emulsion control is accomplished by the entrainment and transfer of surface mass into the annulus of the pipe-way supporting and supplying the secondary nozzle. This liquid mass is transported to the secondary nozzle located near the vessel bottom and mixed with both flow through the primary nozzle and the liquid mass contents at the bottom of the tank. The liquid surface level within the pipe way annulus is depressed below the liquid level in the vessel via the phenomena of hydraulic interaction between the primary and secondary nozzles. The level difference is determined by the geometry of the nested nozzle arrangement, the primary nozzle liquid velocity, the proximity of the secondary to the vessel bottom, the intrinsic properties of the liquid slurry being pumped and the degree of liquid entrainment through the annulus pipe-way. The geometric requirement of the nested nozzle arrangement is illustrated in the embodiment of the invention shown in FIGS. 2, 3, 7 and 8. The range of values of critical dimensions of the nested nozzle arrangement has been described hereinbefore.

Conveyance of surface liquid to the pipe-way annulus is accomplished via the incorporation of a surface device that includes an overflow or weir section that allows flow when differing elevation of the vessel contents between the inside and outside area of the pipe-way annulus is established. The magnitude of the flow transfer under this condition depends upon the geometry of the weir section, the intrinsic properties of the liquid slurry flowing across the device and the magnitude of the liquid surface elevation difference across the weir section. Many overflow configurations can be used to accomplish this action. An embodiment of the floating device for the transfer of surface liquid into the pipe-way annulus is illustrated in FIGS. 2, 3, 4 and 5.

The method of removing scum, clumps of fibrous material and light solids floating on the liquid surface that is not entrained within the bulk liquid slurry by the action of the mixer is not an embodiment of the invention.

Bulk Vessel Circulation

Net vessel circulation is from bottom to top of the vessel by virtue of directed flow from the primary mixing nozzle and induced flow from the mixer annulus into the vessel bottom.

Conveyance of surface liquid to the pipe-way annulus via the surface mounted device, which is a part of the invention, controls circulation at the surface while the location of the intake supply fluid to the primary mixer nozzle enhances mid-zone circulation in the vessel.

Figure 9:
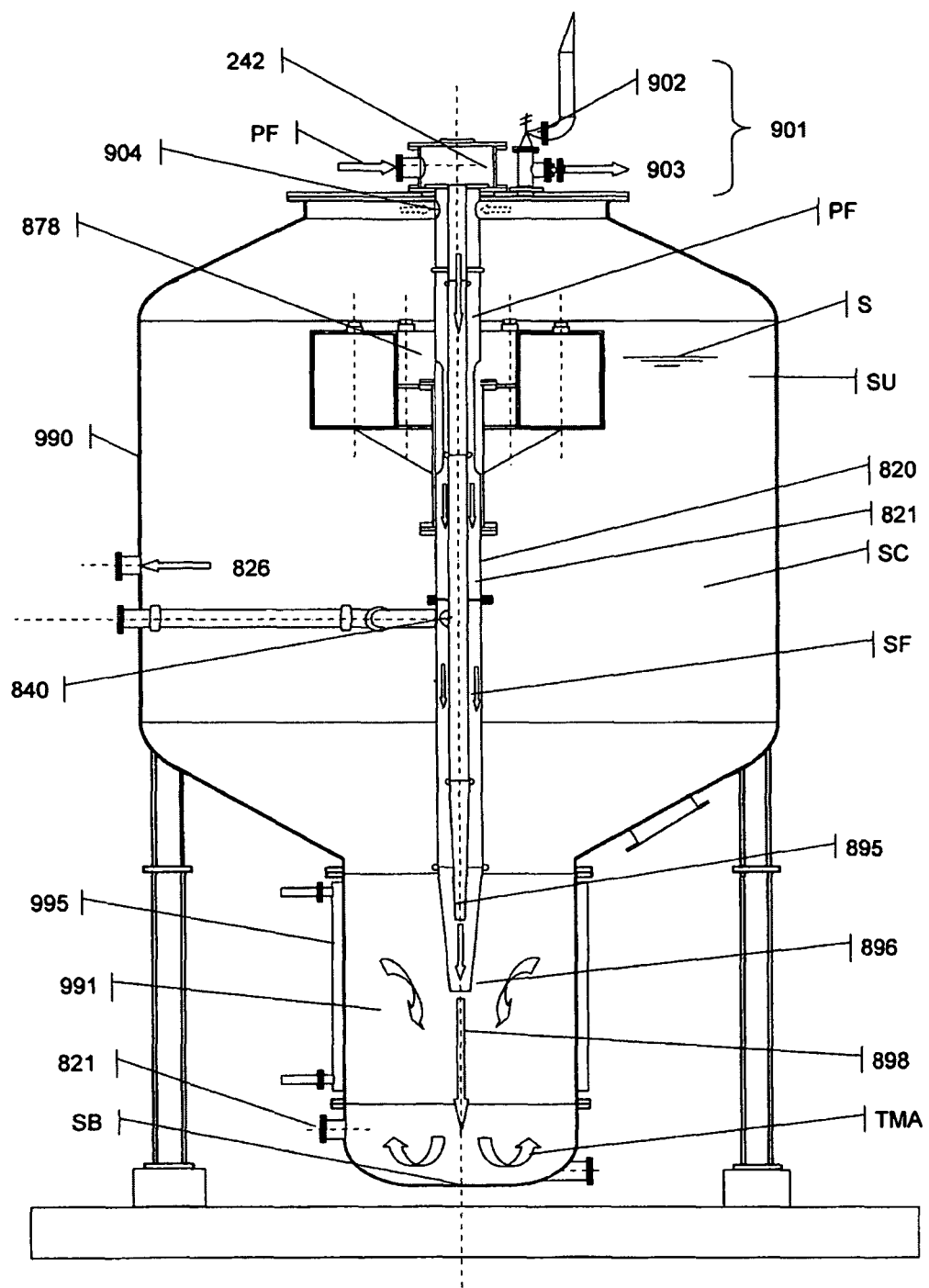
FIG. 9 is a cross sectional view of an alternate embodiment reactor having an enhanced mixing zone.

Referring next to FIG. 9 the reactor 990 has a lower part 991 with a reduced diameter to improve mixing and enhance reaction conditions. An optional heater 995 which can surround the lower part 991.

Figure 10:
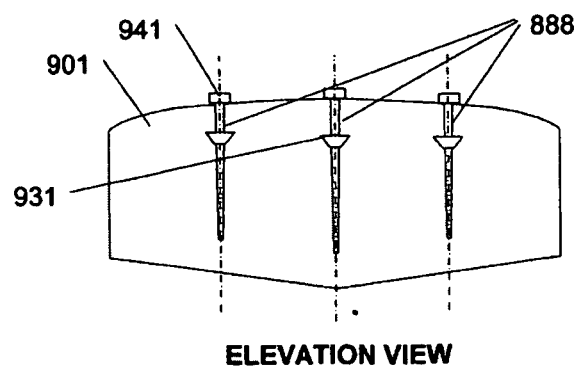
FIG. 10 is a side elevation view of a reactor with multiple drafts, each with nested nozzles.
Figure 11:
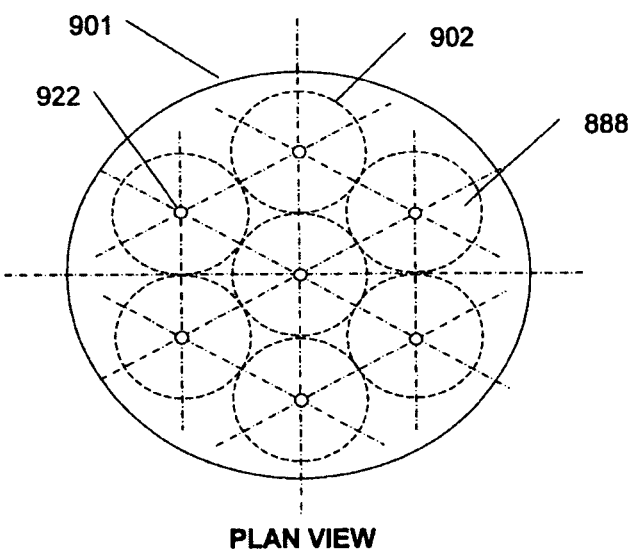
FIG. 11 is a top plan view of the FIG. 10 reactor.

Referring next to FIGS. 10, 11 a large diameter reactor 901 uses multiple (7) mixer assemblies 888.

The figure identifies common features of the mixer including the primary nozzle supply box (941), the mixer weir apparatus (931) and the secondary nozzle and supply pipe (922). Complete mixing is accomplished by locating nozzles in the packing arrangement of seven units indicated.

This packing allows the hydraulic interaction between mixers within the influence area of each mixer (902). In this arrangement the mixers could accommodate a tank diameter ranging from 70 feet (5" primary nozzle @ 20 feet/sec jet velocity) to 170 feet (5" primary nozzle @ 50 feet/sec nozzle velocity). In this embodiment of the invention the largest vessels anticipated for this configuration could be mixed.

Figure 12:
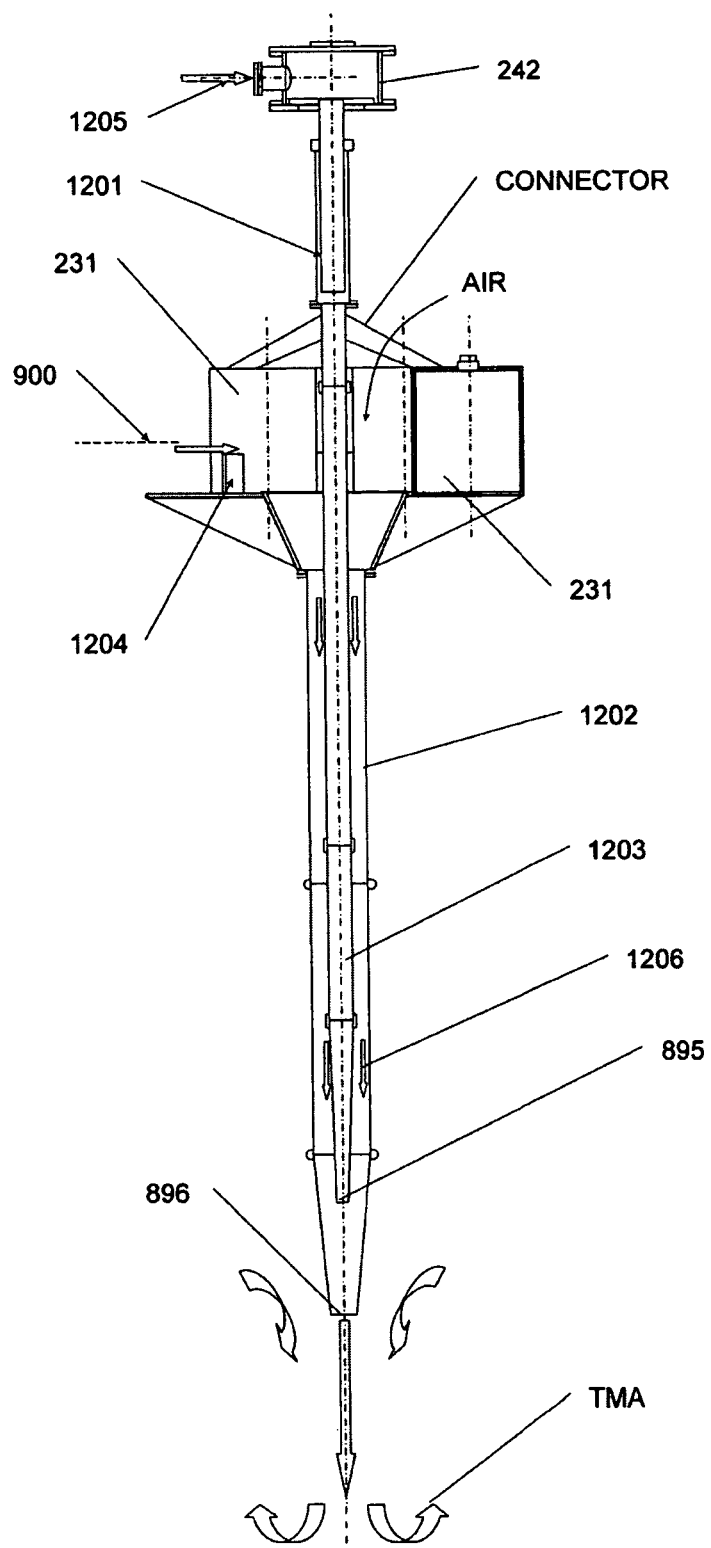
FIG. 12 is a side elevation view of a central draft embodiment where the entire inner and outer pipe assembly is attached to the floating weir to move up and down.

Referring next to FIG. 12 a double channel draft assembly 1200 has ballast tanks 231. However, the outer draft pipe 1202 along with the inner pipe 1203 are connected to the ballast tanks to move up and down as a single assembly. The top of the inner pipe 1203 is a slip tube 1201 which telescopes up to keep the primary nozzle supply box 242 at a fixed location. In operation the inlet weir 1204 rises above the slurry surface 900 when the variable flow rate fluid input 1205 is increased. In this condition air enters weir 1204, thereby evacuating annular channel 1206. This provides operational flexibility to the mixing operator.

Figure 13:
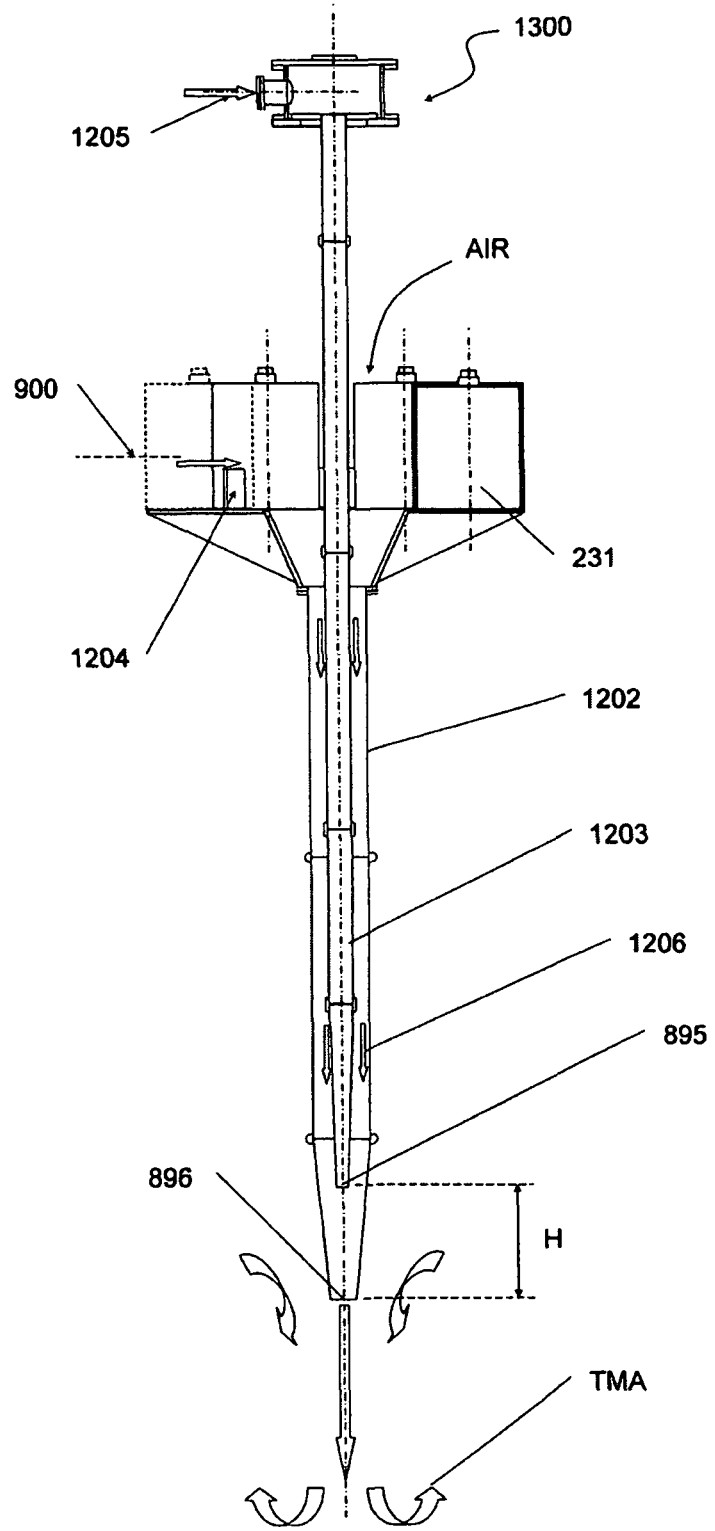
FIG. 13 is a side elevation view of a central draft embodiment where the outer pipe is attached to the floating weir to move up and down.

Referring next to FIG. 13 a double channel draft assembly 1300 has ballast tanks 231 connected only to the outer pipe 1202. Thus, distance H between the nozzles 895 and 896 varies. Channel 1206 will always have slurry and not air in it.

Figure 14:
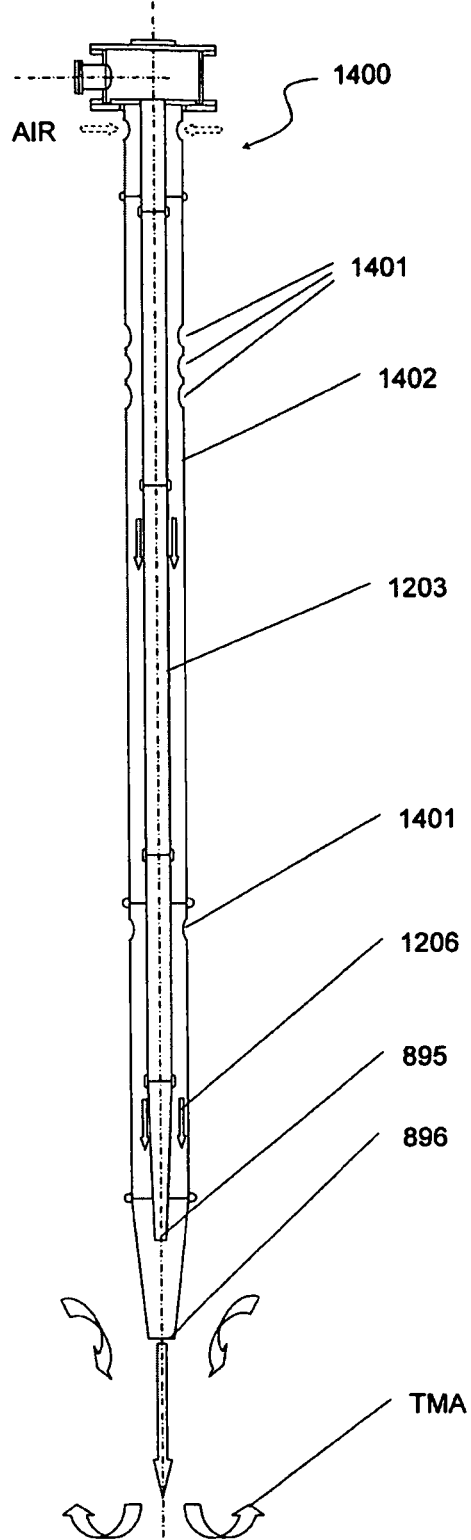
FIG. 14 is a side elevation view of a non-floating weir central draft where stationary outer pipe holes replace a floating weir.

Referring next to FIG. 14 a double channel draft assembly 1400 has slurry inlet holes 1401 in its outer pipe 1402.

Figure 15:
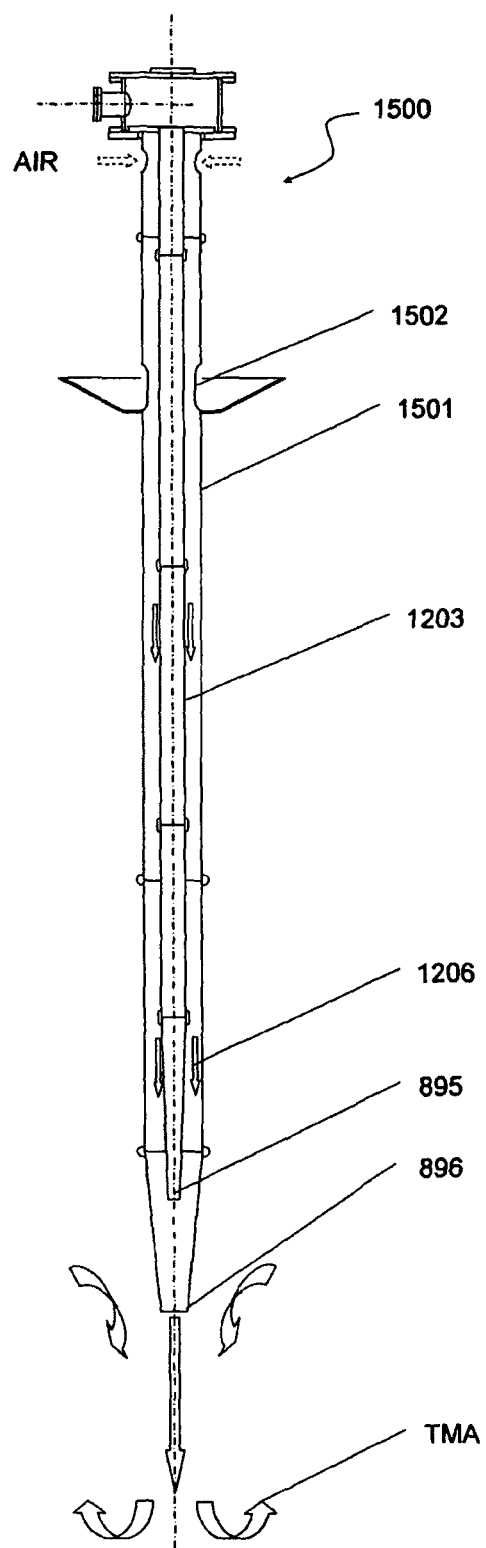
FIG. 15 is a side elevation view of a central draft having a fixed weir.

Referring next to FIG. 15 a double channel draft assembly 1500 has a fixed weir 1502 in outer pipe 1501.

| NESTED NOZZLE MIXER CONFIGURATION | | |
|---|---|---|
| Type | Description | Function |
| FIG. 15 | Fixed Weir Supply/ Fixed Primary and Secondary Nozzle Location | Mixer nozzle locations are fixed in reference to the bottom of the vessel. Fixed weir is located near the tank top and submerged. Primary nozzle velocity induces intense mixing at the bottom of the tank and draws liquid from the top of the tank. Configuration is suitable for tanks with a constant surface level. |
| FIG. 14 | Orifice Supply/ Fixed Primary and Secondary Nozzle Location | Mixer nozzle locations are fixed in reference to the bottom of the vessel. Fixed openings are strategically located along the secondary nozzle supply pipe. Primary nozzle velocity induces intense mixing at the bottom of the tank. Liquid is drawn from the various locations at various intended rates along tank center. Configuration is suitable for tanks with a varying or constant surface level. |
| FIG. 3 | Floating Weir Supply/ Fixed Primary and Secondary Nozzle Location | Mixer nozzle locations are fixed in reference to the bottom of the vessel. Floating weir is located at the water surface in the tank. Weir submergence is fixed. Primary nozzle velocity induces intense mixing at the bottom of the tank and draws liquid from the top of tank in precise quantity. Configuration is suitable for tanks with varying surface level and tanks where surface skimming is desired. |

NESTED NOZZLE MIXER CONFIGURATION

| Type | Description | Function |
|---|---|---|
| FIG. 13 | Floating Weir Supply and Secondary Nozzle/ Fixed Primary Location | Mixer primary nozzle location is fixed in reference to the bottom of the vessel. Floating weir is located at the water surface in the tank. Weir submergence is fixed. Floating secondary nozzle is located at the bottom of the vessel. Distance between primary and secondary velocity induces intense mixing at the bottom of the tank and draws liquid from the top of tank at a quantity that varies with vessel surface level and primary nozzle flow rate. Configuration is suitable for tanks with varying surface level and tanks where surface skimming is desired. |
| FIG. 12 | Floating Weir Supply Secondary and Primary Nozzle float. | Floating weir is located at the water surface in the tank. Weir submergence is fixed. Floating primary and secondary nozzles are located at the bottom of the vessel. Distance between primary/secondary nozzle and vessel bottom varies with vessel surface level. Primary nozzle velocity induces mixing at the bottom of the tank and draws liquid from the top of tank at a quantity that varies with vessel surface level and primary nozzle flow rate. Mixing intensity at bottom of tank varies with relative location of the primary nozzle to the vessel bottom. Configuration is suitable for tanks with varying surface level and tans where surface skimming is desired. |

The mixer is described as providing mixing in three distinctive modes and zones in a storage vessel. In all cases the flow stream components were liquids and liquid slurries.

An additional feature of the mixer design is that it is also capable of mixing in a gas/liquid mixing scenario. In this mode the intensity of the primary nozzle flow is sufficient to draw the liquid level down in the mixer annulus to a level in which gas in the tank head space is drawn through the secondary nozzle where it is dispersed at the bottom of the tank and floats to the surface. This creates another mixing regime desired in many vessel mixing applications. This pattern creates a bottom to top circulation significantly different than the previously described mixer performance in which only liquids and liquid slurries are involved. In applications where surface gas diffusion into the vessel bulk contents is desired this mixer can provide a mixing/gas diffusion capability in one unit where two separate vessel processing systems would normally be required.

Gas/liquid mixing can be provided for mixer configuration types 4 and 5 by precisely controlling the primary nozzle flow velocity and floating weir submergence. In this case liquid/liquid slurry mixing would occur at a lower primary nozzle flow velocity than gas/liquid mixing.

A threshold flow condition in the primary nozzle would void the annulus and reduce the floating weir submergence through mixer buoyant effects. The weir would eventually surface, cutting any liquid flow to the annulus. Headspace gas would than be drawn through the annulus to the primary nozzle location where it would disperse to the vessel bottom.

Figure 16:
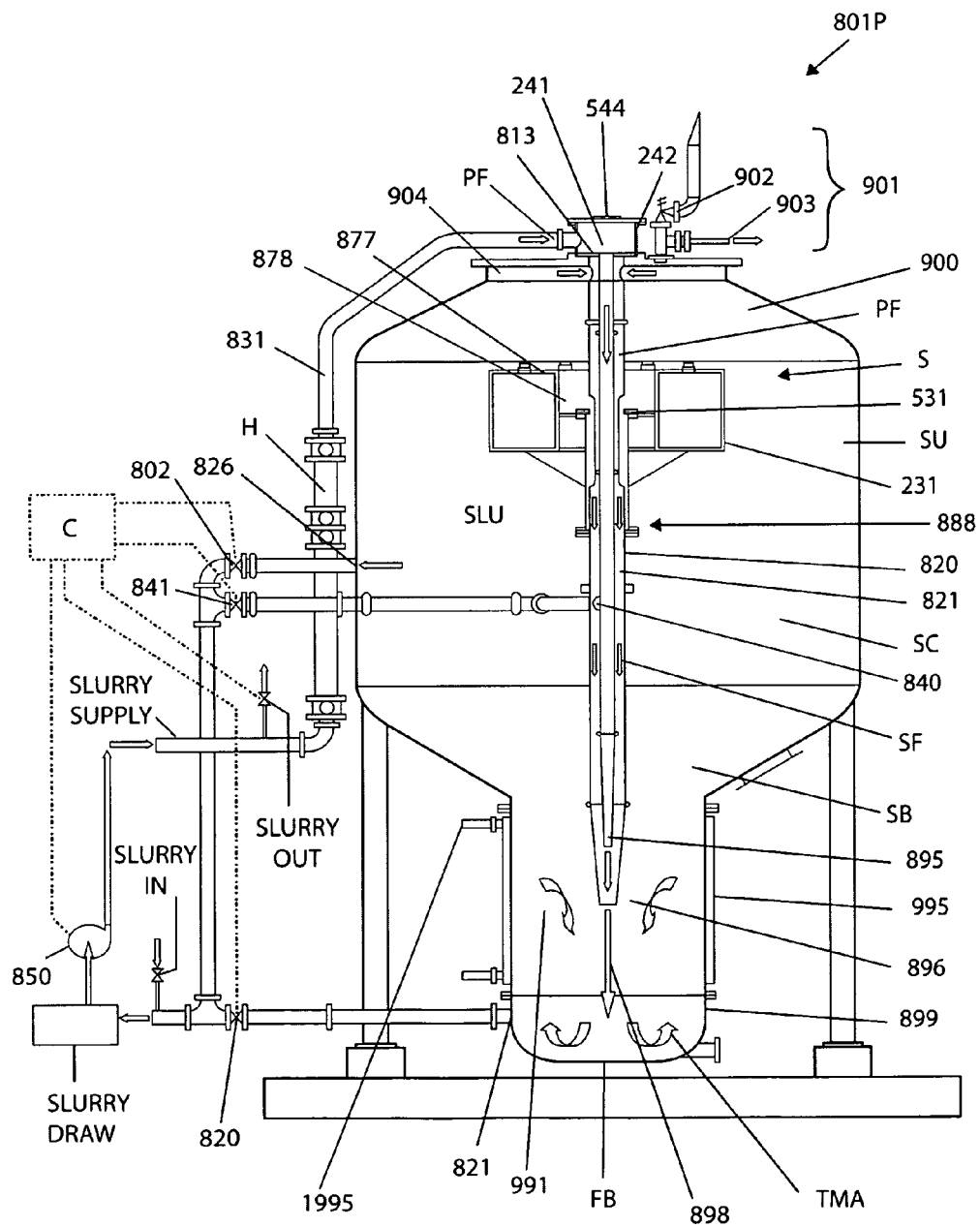
FIG. 16 is a cross sectional view of a pressurized and heated vessel, the preferred embodiment herein.

Referring next to FIG. 16 a reactor 801P has a variable geometry designed to take advantage of the mixer capabilities in a flat bottom (FB) reactor vessel. A single mixer assembly 888 is shown to be center mounted in the reactor 801P. An outer tube 820 surrounds an inner tube 821. The primary flow is indicated by arrows PF in the inner tube 821. The secondary flow is indicated by arrows SF in the outer tube 820.

The primary flow PF is created by pump 850. Normally flow initiates at the center port 826 with valve 802 open and valve 820 closed. When valves 802, 820 are reversed primary flow initiates at port 821, however, solid matter could foul the pump 850. Slurry In/Slurry Out ports indicates one possible feed/discharge of slurry into and out of the reactor 801P. Riser pipe 831 carries the pressurized primary flow PF to the inner tube 821. An intermittent port 840 can initiate the primary flow PF and/or be used in conjunction with port 826 depending on the position of valve 841. A controller C may control the pump 850 and valves as shown. The riser pipe 831 may have a heater H. The secondary flow SF starts at the surface as shown by arrow S.

The biogas pressure in top layer 900 generally varies from 50 to 100 psi. The biogas content is generally about 35% $CO_2$, 60% methane and 5% water.

Figure 17:
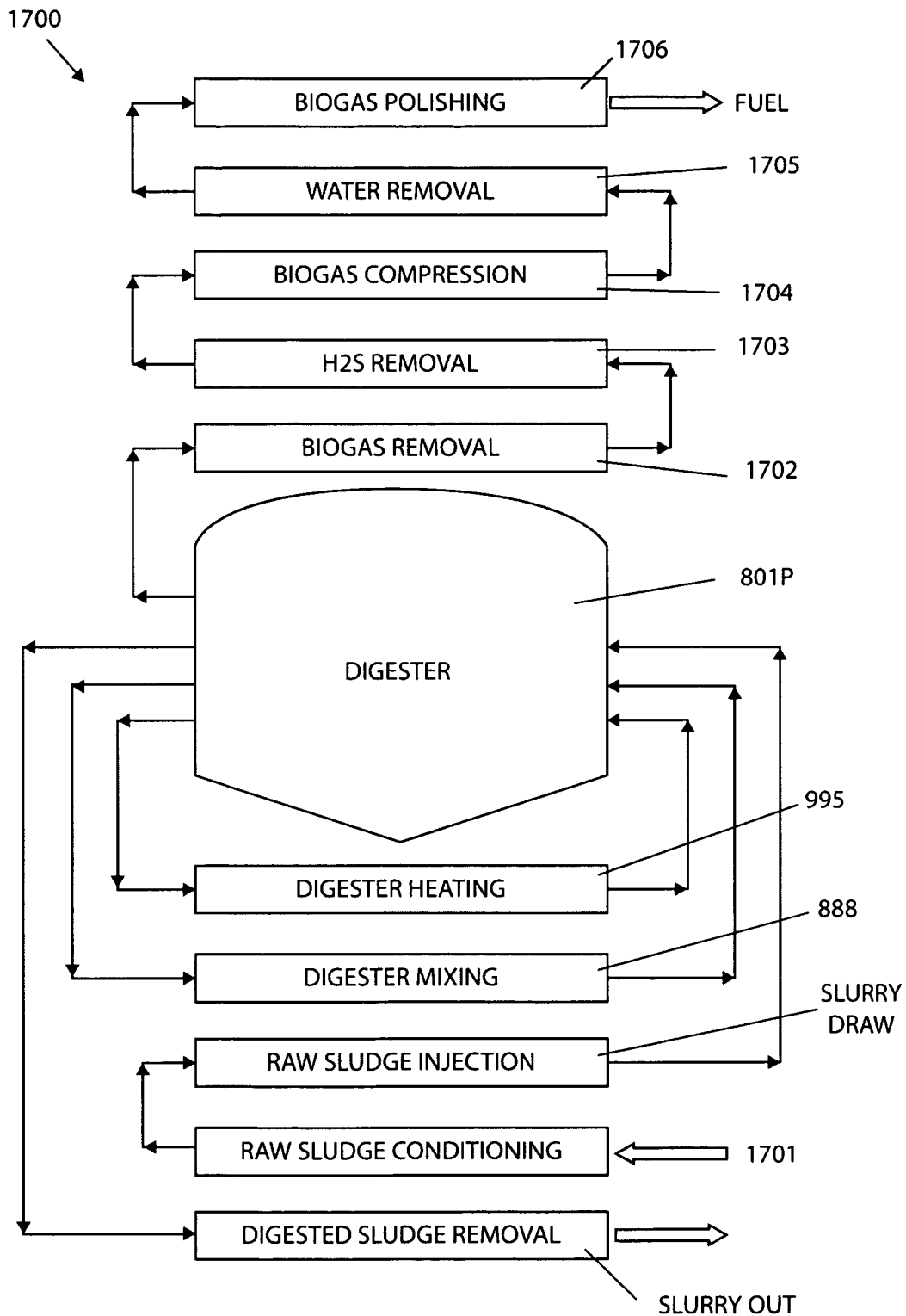
FIG. 17 is a schematic of a digester process using the digester of FIG. 16.

Referring next to FIG. 17 a complete biogas to methane fuel system 1700 is shown with reference to like numbers from FIG. 16. Different slurries require raw sludge conditioning at 1701. After digester 801P operation, a biogas removal module 1702 is needed. Next the water is removed in module 1703. Next the biogas is compressed at 1704. Again water is removed at module 1705. Biogas polishing at module 1706 readies the methane for delivery at FUEL.

This reactor 801 has a floating weir 877 with inlet ports 878 into the secondary flow SF in the outer pipe 820.

The primary nozzle 895 has a discharge 897 which creates a vacuum via a venturi effect and draws the secondary flow SF downward. The primary nozzle 895 is nested in the secondary nozzle 896. Primary nozzle flow is in the range of 20-50 feet per second. (FPS) The primary nozzle has a taper angle of 4 degrees or less. The combined nozzle flow at 898 creates a minimum 5 FPS impingement flow at the bottom FB and a minimum impingement at the wall shown by arrow 899.

The reactor 801P levels are the slurry bottom mixing zone SB, the slurry center mixing zone SC has suspended solids, and the slurry upper mixing zone SU has a top foam/froth layer 900. Arrows TMA show the circular turbulent mixing area.

The reactor head 901 consists of a flange 813 to support the tubes 820, 821. Tube 820 may have an annulus vent 904. The reactor 801P is a pressure vessel. A pressure control device 902 maintains a desired pressure wherein the pressure is created by the biogas generated by the slurry SLV. A gas outlet is shown at 903. Arrows TMA show how the downward facing nested nozzles 895, 896 create an upflow.

The primary nozzle supply box 242 diverts the horizontal primary flow PF to a downward primary flow PF in area 241. The primary flow PF usually ranges from 5-10 FPS. An alternate slurry removal point SLURRY OUT is shown. Three or more ballast tanks 231 on the weir 877 supply buoyancy so the weir 877 floats below the liquid surfaces S. A cylindrical tube section 531 allows the weir 877 to slide up and down the outer tube 820. Ports 878 to outer tube 820 may be slotted.

The head assembly 901 has a flanged hatch 544 for inspection of the primary nozzle supply box 242. A heater 995 can be electric with power cords 1995

The reactor 801P is a unique digestion processes in which several innovations have been combined to provide, at reasonable cost, a highly efficient digester with low operation and maintenance cost features. The reactor is designed to thicken digesting slurry and improve fuel gas quality while reducing volatile solids in an environment that extends the residence time of hard-to-digest solids. Pressurized operation characterizes the basic enhancements of this process.

The bioreactor 801P features a pressure vessel of specific geometry designed to establish zones of differing slurry constituent consistency. A single nozzle mixed vessel is tall with tank overall height to main body diameter ratio of from 2 to 4 depending upon mixer nozzle size.

The vessel mixer is designed to entrain both floating and settling solids while imparting variable mixing intensity to different regions of the tank. This operation functions to segregate the heavier, harder to digest, solids in an actively mixed region at the base of the tank allowing for longer digestion periods for this constituent of the reactor biomass. High pressure operation allows for improved digestion conversion of these solids. In addition, the vessel pressure is maintained sufficiently high to create a high concentration of dissolved gas in the slurry during digester operation and allow for the operation of regenerative thickening process within the reactor.

A dissolved gas thickening process operating procedure is incorporated into the reactor design where vessel pressure is lowered sufficiently to release dissolved gas in a controlled manner resulting in regional segregation of slurry components. Separation can be enhanced by selective polymer injection.

Operational feature descriptions consistent with the subsystems noted previously for digester systems operating smoothly at high efficiency producing a predictable supply of usable biogas are described as follows.

Raw Sludge Conditioning

In most liquid applications digester tanks are hydraulically sized to meet a target residence time desired for the organic feedstock being digested. The reactor 801P is capable of thickening the injected biomass reducing the net size of the vessels needed to serve applications where the liquid feedstock is a weak solution of organic matter. This feature can eliminate an entire conditioning process operation along with its capital cost.

Raw Sludge Injection

The reactor 801P is designed as a continuous digester where organic material is constantly or regularly fed into the vessel. Feedstock must be injected at high pressure which is different the most digester operations. However, due to physical characteristics sludge is normally moved using positive displacement pumps. These pumps are well suited to pumping at the pressures need to feed reactor 801P. Raw sludge is normally injected into the mixer supply pump suction line resulting in the diffusion the feed sludge into the digester circulating stock.

Digester Mixing

One of the basic innovations of the reactor 801P is the use of the Nested Nozzle Mixer 888. Controllable mixer performance and operating costs are directly associated with Nested Nozzle Mixer 888.

The mixer simultaneously mixes liquid slurries in three general mixing zones (bottom, center and surface) within a reactor. The bottom zone of the vessel/reactor mixed by this unit is disrupted via the high velocity jet of mixed liquid impinging on the floor of the reactor. The magnitude of the liquid flow and velocity is sufficient to mobilize and entrain solids that tend to settle and collect in the bottom of the vessel. The secondary nozzle jet entrains additional liquid within the center and bottom zone of the vessel reactor. Mixer flow drafted from the top of the tank creates a center to top zone circulation.

The mixer 888 is capable of creating high enough turbulence in the bottom zone of the reactor to make justify the use of plate coil heat exchangers. In addition, it is capable of re-entraining settled and floating solids making regenerative thickening feasible as a reactor process.

Digester Heating

The reactor 801P has been designed to be heated in a manner consistent with its unique shape. The geometry of the reactor bottom (less than half the diameter of the center of the vessel) not only sustains an extremely well mixed entraining volume, but also allows for the incorporation of prime surface heat exchangers mounted against the exterior of the bottom wall. The attainable energy levels produced by Nested Nozzle Mixers 888 are estimated in the following table.

TABLE 1B

TALL VESSEL/ENHANCED MIXED ZONE PERFORMANCE
Theoretical Tank/Vessel Mixing Zone Specific Power Consumption

| Nozzle Dia. | 20 fps Velocity | | 30 fps Velocity | | 40 fps Velocity | | 50 fps Velocity | |
|---|---|---|---|---|---|---|---|---|
| Inches | bhp/kgal | W/l | bhp/kgal | W/l | bhp/kgal | W/l | bhp/kgal | W/l |
| 0.5 | 1.13 | 0.22 | 3.83 | 0.75 | 9.08 | 1.79 | 17.73 | 3.49 |
| 1 | 1.91 | 0.38 | 6.45 | 1.27 | 15.29 | 3.01 | 29.86 | 5.88 |
| 1.5 | 2.13 | 0.42 | 7.19 | 1.42 | 17.03 | 3.36 | 33.27 | 6.55 |
| 2 | 1.73 | 0.34 | 5.82 | 1.15 | 13.80 | 2.72 | 26.96 | 5.31 |
| 2.5 | 1.21 | 0.24 | 4.09 | 0.81 | 9.70 | 1.91 | 18.95 | 3.73 |
| 3 | 0.88 | 0.17 | 2.97 | 0.59 | 7.05 | 1.39 | 13.76 | 2.71 |
| 3.5 | 0.70 | 0.14 | 2.37 | 0.47 | 5.61 | 1.11 | 10.97 | 2.16 |
| 4 | 0.57 | 0.11 | 1.94 | 0.38 | 4.59 | 0.90 | 8.96 | 1.77 |
| 4.5 | 0.51 | 0.10 | 1.72 | 0.34 | 4.07 | 0.80 | 7.95 | 1.57 |
| 5 | 0.48 | 0.09 | 1.62 | 0.32 | 3.83 | 0.75 | 7.48 | 1.47 |

Typically, the minimum specific power consumption required to maintain good heat transfer is approximately 1.0 W/l.

The heating system 995 for reactor 801P is simple and highly reliable. The heat exchanger is isolated from the sludge by the wall of the reactor. Wall section construction at the location of the heat exchanger can be stainless steel or glass-lined as is appropriate for the application. The heat exchanger is mounted to the exterior surface of the wall using heat transfer. Hot water supplied heat exchangers are normally preferred for the following reasons:

1. The temperature in the jacket can be controlled more accurately with hot water than with steam.
2. Hot water distributes heat more evenly than steam. This eliminates hot spot which often cause product to bake onto the walls of the vessel.
3. The bioreactor uses a glass-lined bottom section steam can shock and damage the lining.

The heater 995 can take the form of a steam or hot water boiler or a heat recovery boiler receiving hot exhaust gas from an engine or turbine.

Digested Sludge Removal

The reactor 801P is different from most digester processes in that there are two types product removal occurring during normal operation. The first type is the release of a clarified liquid effluent when the process undergoes a regenerative thickening step.

Thickening Effluent

The reactor produces a clear effluent through a flotation process. This liquid is removed at slurry out in FIG. 16 prior to re-pressurization of the reactor. It is decanted at a location towards the top of the vessel allowing a liquid volume reduction and resultant thickening of the reactor feedstock. This effluent can be wasted to a location suitable for treating clear wastewater.

Thickened Digested Sludge Removal

The second type of product removal is the thickened digested sludge removed on a relatively continuous basis from the bottom of the reactor. This material can be wasted to a location suitable for dewatering waste sludge.

Biogas Removal

Biogas produced in reactors 801P is of better quality than gas removed from conventional digesters. The gas exists in the reactor in physical equilibrium with the liquid at its operating temperature. At this condition the water vapor concentration which constitutes almost 5% of the gas in normal digesters is significantly lower. CO2 is highly soluble in water at this condition as well (making regenerative thickening possible) resulting in a reduction of CO2 concentration in the biogas as well. When energy recovery systems are used the gas requires significantly less conditioning reducing the O&M costs associated with these processes.

Fuel Gas Conditioning

The percentage of methane in the gas produced in the ET2 Bioreactor will be at least 70% with water vapor concentration ⅕ of gas from standard digesters. Carbon dioxide concentration will be lower as well. Although hydrogen sulfide concentration will be lower it will still require treatment to remove in most applications.

Bioreactor Performance

The reactor 801A claims superior performance with low operation and maintenance cost features. Basic performance concepts resulting in these claims are pressurized operation, the selective control the residence time of hard-to-digest solids and the ability to thicken digesting slurry. In addition the system is provided with subsystems of simple and reliable construction of minimum mechanical complexity.

Basis of Enhanced Process Performance

FIG. 17 shows a simplified schematic of this system with biogas recovery and conditioning for ultimate use in a renewable energy generation system. General descriptions of the system elements were provided previously. Process performance features are made possible through the incorporation of these elements of environmental control in the reactor 801P.

Pressurized Operation

The concept of biological treatment in a pressurized environment has been a subject of investigation. Researchers generally agree that the performance of biological sludge treatment processes is enhanced in a controlled pressurized environment. Conventional digesters operating at less than 1 psi biogas pressure are generally capable of reducing volatile solids in wastewater sludge service by 50 percent. A 20 percent improvement of volatile solids reduction performance @ 40 psi biogas pressure is projected for this system.

In addition to volatile solids reduction performance improvement, pressurized operation makes possible the process concept of regenerative thickening via a dissolved gas flotation procedure within the vessel. This process function is expanded in the following sections.

Solids Residence Time Control

Historically, digesters have functioned in many modes satisfying the needs of operators regarding performance and O&M costs. Digester mixing conditions vary widely from complete mix to unmixed and still satisfy process needs of the Owner. The designer understands that performance varies with a range of parameters.

Current trends promote complete mix in digester reactors while removing digested contents of a consistent solids fraction. This operation results in an equal liquid and solids constituent residence time. Most agree that digestion of fine slurries occur quicker than slurries containing large solid size of identical total mass. Those who operate unmixed systems use this processing tool when decanting their reactors. This suggests that a process for improving the performance of a digester would be to selectively control the removal rate of liquid and solid fraction of digester contents. As long as the thickened portion of the biosolid slurry remains well mixed, creating a rich environment of bacteria and food source, digestion rate is improved reducing the necessary size of the reactor or increasing solids reduction efficiency for an equivalent reactor residence time. The bio reactor 801P is designed to operate in precisely this manner.

The reactor mixing system can operate in a range of energy levels. In one mode the mixing level is strong in the bottom zone promoting high rate digestion in the concentrated solid slurry there. Reactor diameter and height above this section causes the liquid velocity to slow considerably causing the heavy fraction of the biomass to settle back into the bottom zone. During this mode of operation selective removal rates of digester slurry in the two regions will control the retention times of both constituents.

Criterion for Settling

The degree of solid segregation in the reactor vessel is estimated using particle settling velocity criteria which incorporate Reynolds number, Stokes' and Newton's laws. The Reynolds number is a dimensionless parameter describing the ratio of inertial to viscous forces in the flow. To identify a range in which Stokes' law describes the motion of the particle, substitution of the velocity term of the Reynolds number using Stokes' law yields the following:

$$N_{RE,p} = \frac{D_p u_t \rho}{\mu} = \frac{D_p^3 g \rho(\rho_p - \rho)}{18\mu^2}$$

Defining the criterion K as:

$$K = D_p \left[\frac{g\rho(\rho_p - \rho)}{\mu^2}\right]^{1/3}$$

Yields the resulting equation:

$$N_{Re,p} = K^3/18$$

If $N_{Re,p}$<1.0 or if K is less than 2.6 then Stokes' law applies.

Similarly, to identify a range in which Newton's law describes the motion of the particle, substitution of the velocity term of the Reynolds number using Newton's law yields the following:

$$N_{Re,p} = 1.75 K^{1.5}$$

If 1,000<$N_{Re,p}$<200,000 or if 68.9<K<2,360 Newton's law applies.

When K>2,360 or 2.6<K<68.9, $u_t$ is found from $$u_t = \sqrt{\frac{4g(\rho_p - \rho)D_p}{3C_D \rho}}$$

For this application Co of sludge particles is calculated using the equation:

$$C_D = 18.5/N_{Re,p}^{0.5}$$

In English units, the kinematic viscosity of water is about $1.0 \times 10-5$ ft²/s, density 1.940 slug/ft³ and dynamic viscosity is about $1.940 \times 10-5$ slugs/ft/s. For the range of particle sizes of interest the range of K expected is 2.6<K<68.9. The limitation of settling zone vertical rise velocity as well as the anticipated reactor 801P settling zone velocity range estimates that the reactor is capable of segregating and settling the digesting sludge particles of varying density into a zone at the bottom of the vessel. It is anticipated that the light fraction of the reactor will operate at a retention time of from 10 to 15 days with the heavy fraction being digested for an average of from 30 to 60 days.

In Vessel Solids Thickening

As noted previously the reactor process can increase solids residence time and to a limited extent thicken the slurry. Another advantage of operating a digesting reactor at high relative pressure is to incorporate a process of dissolved gas flotation thickening referred to herein as regenerative thickening. In this process the digester takes advantage of the carbon dioxide produced to thicken the mixture by removing a clear zone of digested liquid after the solids have been separated through digester pressure control.

Regenerative Thickening

If we assume $CO_2$ is a simple gas we can apply Henry's law that describes the equilibrium between vapor and liquid as follows:

$$P_{CO2} = KXCO2$$

where:

$P_{CO2}$=partial pressure of the gas in the bulk atmosphere (Pa)

K=constant (Pa))

$X_{CO2}$=equilibrium mole fraction of solute in liquid phase

According to Carrol and Mather [4] a form of Henry's law can be used for modeling the solubility of carbon dioxide in water for pressures up to 100 MPa.

They concluded that the Krichevsky-Kasarnovsky Equation, which can be derived from Henry's Law, can be used to model the system $CO_2$—$H_2O$ at temperatures below 100 deg. C. For digesters whose temperature ranges from 35-40 deg. C., the Henry coefficient K for $CO_2$ in water varies from 200-220 MPa/mole-fraction. The concentration of $CO_2$ in a pressurized digester operating at 60 psig (5.2 bar) can be calculated assuming that the concentration of $CO_2$ in the produced biogas is 35% by volume.

The partial pressure of $CO_2$ in the gas phase:

$$P_{CO2} := 0.35 * 5.2 * 0.1 := 0.182 \text{ MPa}$$

Applying Henry's Law we calculate a $CO_2$ mole fraction in water in the range:

$$X_{CO2} = 0.182(210 := 0.000867$$

Converting mole fractions to concentrations:

The molar density of water=994.37(18.02:=55.18 mol/l

The $CO_2$ concentration range in water under these conditions is:

$$CO_2 = 0.000867 * 55.18 = 0.048 \text{ mol/l}$$

Volume concentration of $CO_2$ @5.2 bar $$V_{CO2} = 0.048 * 22.4 = 1.08 \text{ l } CO_2@STP/l \text{ water} = 1.08 \text{ cm}^3 CO_2/\text{g water}$$

Similarly @ 1 bar pressure:

$$V_{CO2}\text{out} = 1.08/5.2 = 0.21 \; CO_2@STP/l \text{ water} = 0.21 \text{ cm}^3 CO_2/\text{g water}$$

The amount of $CO_2$ liberated when digester liquid pressure is dropped from 5.2 to 1 bar is:

$$V_{CO2}\text{out} = 1.08 - 0.21 = 0.871 \; CO_2/l \text{ water}$$

Calculations show that there is enough $CO_2$ liberated from depressurizing this digester to support a dissolved gas thickening process option. The following table indicates the potential for gas liberation in dissolved gas thickening process based upon reactor pressure.

TABLE 1C $CO_2$ LIBERATED IN DIGESTER REGENERATIVE THICKENING PROCESS

| Reactor Pressure (bars)/(psia) | 1.5/22 | 2.0/29 | 2.5/36 | 3.0/44 | 3.5/51 | 4.0/58 | 4.5/65 | 5.01/73 |
|---|---|---|---|---|---|---|---|---|
| vc02 out (I CO:z/l water) | 0.10 | 0.21 | 0.31 | 0.41 | 0.52 | 0.62 | 0.72 | 0.83 |

It is anticipated that the reactor 801P regenerative thickening process will be conducted at a vessel pressure of from 30 to 60 psi. This range of operation encompasses that of a conventional DAF thickener in wastewater service (40-45 psi).

Basis of Capital Cost Savings

The system 801P and subsystem components are few and simple devices. They include:

1. Reactor Vessel

A pressure vessel of specific geometry and capacity.

2. Mixer

Proprietary nested nozzle mixer specifically designed for the ET2 Bioreactor.

3. Mixer Pump

A standard solids handling centrifugal pump with suction grinder capable of delivering head and flow required by the mixer size selected for the reactor vessel.

4. Jacket Heat Exchanger

Standard dimpled surface plate jacket heat exchanger contoured to fit the radius of the enhanced mixing zone section of the reactor vessel.

5. Boiler

Standard dual-fueled low pressure steam or hot water boiler with accessories sized for the operating conditions of the reactor vessel.

6. Heating Media Supply and Temperature Control

Steam or hot water control valve and heating media supply equipment designed for the operating conditions of the reactor.

7. Sludge Diverter Valves

Power-actuated valves controlling sludge draw location for mixer pump supply and sludge wasting from reactor.

8. Reactor Control System

A reactor control system capable of automatically controlling all reactor equipment and all reactor processing operations.

Capital cost comparisons for the reactor system 801P are investigated in the following Inlet Sludge Supply and Conditioning System Feedstock must be injected at high pressure into an reactor 801 P as noted previously. However, since sludge is normally moved using positive displacement pumps which are well suited to pumping at the pressures needed to feed reactor 801P it is anticipated that the additional cost of high pressure operation is minimal.

Reactor Vessel

Construction materials for digester reactors are generally concrete and steel. Normally the two primary purposes for the use of tanks are to provide for volume and pressure. In addition the reactor 801P is designed to specific size requirements of top, middle and bottom zones to support the digester environment in these areas. The reactor is constructed as a steel pressure vessel and intended to be used in a capacity range of from 1,500 to 150,000 gallons.

As is normally the case, the cost per unit capacity vessels tend to increase as the tank volume decreases. This vessel is no different.

The unit cost of the reactor vessel tends to be high in sizes above 25,000 gallons. However, above this capacity the basic tank configuration approaches a reasonable cost of approximately 2 $/gal.

Reactor Mixing and Heating System Mixer

When investing in a digester reactor mixer there is no advantage to over-sizing. Over-mixing does not generally improve performance efficiency, it increases O&M costs and it can intensify undesirable operating conditions such as foaming. There is an advantage in installing a mixing system with the flexibility that can be controlled to accommodate various mixing scenarios anticipated during the digestion process at as Iowan operating cost as possible. An increased capital investment is expected here as the net savings due to a reduction in O&M cost overcomes the added investment limitation. That said the cost of the Nested Nozzle Mixer 888 is less expensive than most digester mixing systems even in the desired configuration noted. Other advantages of this mixer include:

Single unit configuration
Completely removable without reactor draining
Potentially no electrical components in classified reactor zone
Easily inspected and maintained
No permanent mechanical equipment in reactor zone The installed cost of this mixing system is among the lowest of all reactor mixer types.

Heating System

This reactor system is designed to use a surface heat exchanger or heating jacket to maintain reactor temperature. Prime surface heat exchangers offer the following installation advantages over conventional heat exchangers used in digester service.

Much smaller footprint
Lighter weight
Easier installation
Less energy fluid
Lower capital cost In the configuration proposed (bolted surface mount) the overall heat transfer coefficient (OHTC) is lower than a conventional unit suggesting that a larger heat exchanger is required. The following table indicates the range of OHTC anticipated for this heating system.

TABLE 1D

PRIME SURFACE HEAT EXCHANGER PERFORMANCE

| MOUNTING CONDITION | OHTC (U) |
| --- | --- |
| With heat transfer mastic | 30-40 Btu/hr sq ft ° F. |
| Without heat transfer mastic | 15-25 Btu/hr sq ft ° F. |

Although the relatively low OHTC requires the installation of more heat exchanger surface area than a conventional sludge heat exchanger. The required size can be reduced by the use of a higher heating fluid inlet temperature resulting in a lower cost This is made possible because of the high degree of mixing provided in the enhance mix zone designed into the reactor. This mixing aids heat transfer by reducing the interior reactor wall temperature to a level supporting good heat flux without causing the undesirable side-effect of plating or baking sludge.

Controlling Reactor Surface Temperatures

At steady state, the heat flow through the exchanger wall/heat transfer mastic/tank wall to the inside tank surface equals the heat flow from the surface to the digester slurry. In equation form:

$$q_{he} = q_{surf}$$

OR:

$$((k/Xw) \times (T_{hot} - T_{surf}) = h_w \times (T_{surf} - T_{slurry})$$

$$((k/Xw)/h_w) \times (T_{hot} - T_{surf}) = T_{surf} - T_{slurry}$$

$$T_{surf} + T_{surf} \times ((k/Xw)/h_w) = ((k/X_w)/h_w) \times T_{hot} + T_{slurry}$$

$$T_{surf} \times (1 + ((k/Xw)/h_w)) = ((k/X_w)/h_w) \times T_{hot} + T_{slurry}$$

$$T_{surf} = (((k/X_w)/h_w) \times T_{hot} + T_{slurry})/(1 + ((k/X_w)/h_w))$$

FOR:

$$((k/X_w)/h_w) = C_{ES}$$

$$T_{surf} = (C_{ES} \times T_{hot} + T_{slurry})/(1 + C_{ES})$$

For this heat exchanger Xw/k is approximately equal to 0.0125 $(Btu/ft^2 \; h° \; Fr)^{-1}$ and the convective heat transfer coefficient for the liquid slurry ($h_w$) can vary from 500 to 10,000 $W/m^2K$ (88 to 1762 $Btu/ft_2/h/°$ F.). It is normal to limit the inside surface temperature of the reactor to 120 deg. F. to prevent the formation of a 'baked' surface on the reactor wall. For mesophilic digestion the liquid slurry temperature is maintained at 98 deg F. The following figure indicates the allowable heating media temperature when the maximum reactor wall surface temperature is limited to 120 deg F.

The reactor can tolerate a heating media temperature as high as 230 deg F. if the convective heat transfer coefficient for the liquid slurry ($h_w$) is maintained above 400 Btu/ft/h/° F. The turbulence developed in the enhanced mix zone of the ET2 Bioreactor will maintain a convective heat transfer coefficient well above this limitation.

If the enhanced mix zone surface area of the reactor is large enough to accommodate the prime surface heat exchange size requirement no net increase in control room space is required to house the heat exchanger.

Digested Biomass Removal and Disposal System

The reactor 801P operates at a pressure of 50-psig. Its mixer is powered by a pump that develops a head of at least 30-psi. When functioning normally, this reactor can expel sludge at a driving pressure as high as 8O-psi without incorporating a dedicated pump station design for this duty.

This document uses the following formula to estimate the cost of small liquid slurry pumping stations.

$$Cost_{ps} = 601,000 \times (Flow_{MGD})^{1.08}$$

Minimum $Cost_{ps} = \$50,000$

This formula indicates that the cost of any pumping system with a rated flow below 70 gpm is estimated to be $50,000. In the range of reactor sizes proposed here, biomass removal rate could exceed 70 gpm if desired, but not necessary for attaining the desired performance. However, the savings is significant and can offset the cost of the reactor vessel required to handle system operating pressure.

Biogas Removal and Conditioning System

Biogas exiting reactor 801P leaves at a pressure of 50 prig. Gas at this pressure is sufficient to directly power most turbocharged engine generators without requiring a booster system. In addition, the amount of water vapor in the gas is ⅕ that of biogas produced in a conventional digester. The capital cost to accomplish these features is significant. Booster compressor stations are expensive due to the special features required to house and protect facilities incorporating fuel gas compressors. This document uses the following formula to estimate the cost of fuel gas booster stations for engine generator service.

$$\text{Cost}_{gb} = 4.34 \times \text{Gen. Size}_{Kw} + 152{,}700$$

This formula indicates that the cost of any fuel gas compressor station for generator capacities to 1000 Kw will not vary significantly from an average of $155,000. In the range of reactor sizes proposed here the savings from eliminating a gas booster station is significant and can offset the cost of the reactor vessel required to handle system operating pressure.

Life Cycle Cost Comparison

A life cycle cost comparison is provided at the end of this document. Life cycle costing (LCC) is a technique used to evaluate alternatives in the development phase of system selection and design. LCC is used to compare the total cost of competing alternatives for satisfying comparable functions.

The LCC comparison is expressed in three major categories: (1) initial capital costs, (2) future replacement costs and (3) annual costs and revenues.

Initial capital costs are the direct costs incurred in constructing facilities, such as those for materials, labor, and equipment.

Future replacement costs include major capital expenditures to rehabilitate equipment.

Annual costs include operation and maintenance (O&M) energy costs.

The cost for a system element is typically computed by applying a unit cost developed from cost tables to a specific unit quantity. If previous cost estimates are used, a ratio of the Engineering News Record's Construction Cost Index (ENR CCI) values is applied to update the cost to 2009 values. The index measures how much it would cost to purchase a hypothetical package of goods and services compared to what it was in a base year.

Solids Residence Time Control and Regenerative Thickening

The largest process that contributes to a lower LCC for the digester 801P is the effect of solids residence time and regenerative thickening. The LCC indicates that these processes reduce the average feed residence time by up to 38%. This can be a bit misleading as it can be shown the solids residence time in the digester is high, reaching 45 to 60 days on average. This is accomplished by the segregation and removal of the liquid fraction of the sludge feed that constitutes 95 to 98% of the feedstock. The result of these processes is a significantly smaller digester capacity requirement with an accompanying reduction in equipment size and O&M cost.

Improved Volatile Solids Reduction

The LCC shows the economic effect of a 20% improvement in volatile solids reduction performance claimed by the reactor 801P. This improvement is attributed to high pressure operation and the beneficial effect of regenerative thickening in making more volatile material available for digestion.

Elimination of Pumping Stations

The 801P digester eliminates the need for as many as two process pumping stations. The LCC makes a comparison in which only a sludge wasting pump station is eliminated. However, in most digester applications the sludge heating recirculation pump station would also be eliminated.

Elimination of Gas Conditioning Equipment

The LCC shows that gas compressing and conditioning equipment is expensive. It is noted that a fuel gas compressor station is three to four times more expensive than a comparable liquid pumping system. The LCC shows, in effect, that providing a pressurized gas product by pumping feedstock into a pressurized digester is much more cost effective than compressing a biogas produced in an equivalent low pressure digester.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

We claim:

1. A pressurized digester biogas reactor comprising:
a mixing tank having a bottom, sides and a top;
a bottom portion of the tank having a smaller diameter than a central portion of the tank;
a double channel central draft tube;
a pump forcing an inlet fluid downward through a central channel in the double channel central draft tube into the bottom portion of the tank;
said central channel having a primary nozzle facing downstream;
an outer draft channel housing the central channel;
wherein an annular space between the outer draft channel and the central channel forms a secondary channel;
said outer draft channel having a secondary nozzle facing downstream;
wherein said primary nozzle is located above said secondary nozzle, and both nozzles share a common longitudinal axis;
said outer draft channel having an inlet weir for channeling a mixing tank fluid into the secondary channel;
wherein the pump supplies a minimum of twenty feet per second flowrate to the inlet fluid;
wherein said minimum twenty feet per second flowrate forms a vacuum at a bottom end of the outer draft channel;
wherein said vacuum induces the mixing tank fluid into the weir and out the secondary nozzle;
wherein a combined flow from the primary and secondary nozzles impinge the bottom of the mixing tank;
a slurry in the tank producing a biogas;
a pressure controller located at a top portion of the tank to maintain an operating pressure in the tank in the range of about 30 to 100 psi;
said bottom portion of the tank having a heater;
said pump having an inlet in a central mixing zone of the tank for the inlet fluid; and
said central mixing zone having a slurry outlet to release liquids therefrom.

2. The pressurized digester biogas reactor of claim 1, wherein the primary nozzle has a converging angle from its fluid inlet and to its fluid outlet end of about 4.0 degrees or less.

3. The pressurized digester biogas reactor of claim 2, wherein the outer draft channel inlet weir has a location at a top foam/froth layer of the mixing tank.

4. The pressurized digester biogas reactor of claim 3, wherein the pump has a fluid inlet port located in a center mixing zone of the mixing tank.

5. The pressurized digester biogas reactor of claim 3, wherein the pump has a location below the top of the mixing tank and has a vertical outlet pipe connected to a horizontal inlet pipe to a primary nozzle supply box which diverts the pump outflow to a downward flow in the central channel.

6. The pressurized digester biogas reactor of claim 3, wherein the weir further comprises a ballast tank to float the weir below a fluid surface as the weir and ballast tank slide up and down as an assembly on the outer draft channel.

7. The pressurized digester biogas reactor of claim 2, wherein the primary nozzle has an inside diameter=$d_1$, the secondary nozzle has an inside diameter=$d_2$, and $d_2/d_1$=a range of 2.1 to 2.5.

8. The pressurized digester biogas reactor of claim 7, wherein a distance between an outlet and the primary nozzle to an outlet and the secondary nozzle=$Y_1$, $Y_1 = C_2 \times D_1$, and $C_2$=a range of 6.0-6.4.

9. The pressurized digester biogas reactor of claim 8, wherein $Y_2$=a distance between the mixing tank bottom and an outlet end of the secondary nozzle, $V_o$=a flowrate from the primary nozzle is feet per second, $C_3$=a range of 1.2-1.5, and $Y_2 - C_3 \times d_1 (V_o - Y_1) = (C_3 \times V_o - C_2)(d_1)$.

10. The pressurized digester biogas reactor of claim 9, wherein a mixer influence diameter at the mixing tank bottom in inches $D_m$, $C_4$=a range of 2.6-3.3, and $D_m = C_4 \times d_1 \times V_o$.

11. The pressurized digester biogas reactor of claim 3, wherein the inlet weir further comprises a plurality of holes in the outer draft channel.

12. The pressurized digester biogas reactor of claim 1 further comprising a pressurized raw sludge injector into the tank.

13. The pressurized digester biogas reactor of claim 1 further comprising a biogas removal module, an H2S removal module, a biogas compression module, a water removal module and a biogas polishing module.

14. A pressurized biogas reactor comprising:
a mixing tank having a bottom, sides and a top;
a bottom portion of the tank having a smaller diameter than a central portion of the tank;
a double channel central draft tube;
a pump forcing an inlet fluid downward through a central channel in the double channel central draft tube into the bottom portion of the tank;
said central channel having a primary nozzle facing downstream;
an outer draft channel housing the central channel;
wherein an annular space between the outer draft channel and the central channel forms a secondary channel;
said outer draft channel having a secondary nozzle facing downstream; wherein said primary nozzle is located above said secondary nozzle, and both nozzles share a common longitudinal axis;
said outer draft channel having an inlet weir for channeling a mixing tank fluid into the secondary channel;
wherein a vacuum produced by the primary nozzle induces the mixing tank fluid into the weir and out the secondary nozzle;
a slurry in the tank producing a biogas;
a pressure controller located at a top portion of the tank in the range of about 30 to 100 psi;
said pump having an inlet in a central mixing zone of the tank for the inlet fluid; and
said central mixing zone having a slurry outlet to release liquids therefrom.

15. The pressurized biogas reactor of claim 14, wherein the bottom portion of the tank has a heater.

16. The pressurized biogas reactor of claim 14, wherein the bottom portion of the tank has a shape with a smaller diameter than a central mixing portion of the tank.

17. The pressurized biogas reactor of claim 14, wherein the tank has a central mixing portion with a liquid outlet port.

18. The pressurized blows reactor of claim 14, wherein the top portion of the tank feeds a biogas recovery system.

* * * * *

UNITED STATES PATENT AND TRADEMARK OFFICE
CERTIFICATE OF CORRECTION

PATENT NO. : 8,409,439 B1  Page 1 of 1
APPLICATION NO. : 12/769269
DATED : April 2, 2013
INVENTOR(S) : Ernest Peter Tovani et al.

It is certified that error appears in the above-identified patent and that said Letters Patent is hereby corrected as shown below:

In the Specifications:
Col. 2, Line 21 should read: Next, the biogas goes to the natural gas pipeline to the In the Claims:
Col. 24, Line 38, Claim 18 should read: The pressurized ~~blows~~ biogas reactor of claim 14, wherein the Signed and Sealed this
Thirteenth Day of August, 2013

Teresa Stanek Rea
*Acting Director of the United States Patent and Trademark Office*